United States Patent
Fröberg Olsson et al.

(10) Patent No.: US 12,349,126 B2
(45) Date of Patent: Jul. 1, 2025

(54) PRE-EMPTION PRIORITY LEVEL FOR UPLINK CONTROL INFORMATION (UCI) AND PHYSICAL UPLINK SHARED CHANNEL (PUSCH) CONFLICT RESOLUTION

(71) Applicant: Telefonaktiebolaget LM Ericsson (publ), Stockholm (SE)

(72) Inventors: Jonas Fröberg Olsson, Ljungsbro (SE); Torsten Dudda, Wassenberg (DE); Yufei Blankenship, Kildeer, IL (US); Zhenhua Zou, Solna (SE); Abdulrahman Alabbasi, Kista (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 315 days.

(21) Appl. No.: 17/626,911

(22) PCT Filed: Jul. 17, 2020

(86) PCT No.: PCT/EP2020/070274
§ 371 (c)(1),
(2) Date: Jan. 13, 2022

(87) PCT Pub. No.: WO2021/009345
PCT Pub. Date: Jan. 21, 2021

(65) Prior Publication Data
US 2022/0264604 A1    Aug. 18, 2022

Related U.S. Application Data

(60) Provisional application No. 62/875,622, filed on Jul. 18, 2019.

(51) Int. Cl.
*H04L 5/00* (2006.01)
*H04W 72/1268* (2023.01)
(Continued)

(52) U.S. Cl.
CPC ....... *H04W 72/1268* (2013.01); *H04L 5/0055* (2013.01); *H04L 5/0057* (2013.01);
(Continued)

(58) Field of Classification Search
CPC ........... H04L 1/12–1896; H04L 5/0001–0098; H04W 4/50–70; H04W 8/18–245;
(Continued)

(56) References Cited

U.S. PATENT DOCUMENTS

| | | | |
|---|---|---|---|
| 2020/0137768 A1* | 4/2020 | Jose | H04W 72/56 |
| 2020/0296715 A1* | 9/2020 | Wang | H04W 72/23 |

(Continued)

FOREIGN PATENT DOCUMENTS

| | | |
|---|---|---|
| WO | 2019216817 A1 | 11/2019 |
| WO | 2020165281 A1 | 8/2020 |
| WO | 2020204786 A1 | 10/2020 |

OTHER PUBLICATIONS

3GPP TSG RAN WG1 Meeting #92 R1-1801788; Title: Discussion on partially overlapped PUCCH and PUSCH; Agenda Item: 7.1.3.2.5; Source: Huawei, HiSilicon; Document for: Discussion and decision; Location and Date: Athens, Greece, Feb. 26-Mar. 2, 2018, consisting of 5 pages. (Year: 2018).*

(Continued)

*Primary Examiner* — Timothy J Weidner
(74) *Attorney, Agent, or Firm* — Weisberg I.P. Law, P.A.

(57) ABSTRACT

Apparatuses and methods are disclosed for pre-emption priority level for Uplink Control Information (UCI) and/or Physical Uplink Shared Channel (PUSCH) conflict resolution. In one embodiment, a method implemented in a network node includes indicating to a wireless device (WD) a priority associated with at least one uplink (UL) channel; and receiving at least one UL signal based at least in part on the indicated priority. In another embodiment, a method (Continued)

implemented in a WD includes determining a priority associated with at least one of at least two uplink (UL) channels; and resolving a conflict between the at least two uplink channels based at least in part on the determined priority.

21 Claims, 8 Drawing Sheets

(51) Int. Cl.
*H04W 72/23* (2023.01)
*H04W 72/231* (2023.01)
*H04W 72/232* (2023.01)
*H04W 72/51* (2023.01)
*H04W 72/56* (2023.01)
*H04W 84/02* (2009.01)
*H04W 88/02* (2009.01)
*H04W 88/08* (2009.01)
*H04W 92/02* (2009.01)
*H04W 92/10* (2009.01)

(52) U.S. Cl.
CPC ......... *H04W 72/23* (2023.01); *H04W 72/231* (2023.01); *H04W 72/232* (2023.01); *H04W 72/51* (2023.01); *H04W 72/56* (2023.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ..... H04W 24/02–10; H04W 28/02–26; H04W 48/02–20; H04W 72/02–569; H04W 74/002–008; H04W 76/10–50; H04W 84/02–16; H04W 88/02–12; H04W 92/02–04; H04W 92/10
See application file for complete search history.

(56) References Cited

U.S. PATENT DOCUMENTS

2021/0378005 A1* 12/2021 Marco ............... H04W 72/1268
2022/0070896 A1*  3/2022 Wong ................ H04W 72/1268

OTHER PUBLICATIONS

International Search Report and Written Opinion dated Sep. 18, 2020 for Application No. PCT/EP2020/070274 filed Jul. 17, 2020, consisting of 8 pages.
3GPP TSG RAN WG1 Meeting #92 R1-1801788; Title: Discussion on partially overlapped PUCCH and PUSCH; Agenda Item: 7.1.3.2.5; Source: Huawei, HiSilicon; Document for: Discussion and decision; Location and Date: Athens, Greece, Feb. 26-Mar. 2, 2018, consisting of 5 pages.
3GPP TSG RAN WG1 Meeting #95 R1-1812414; Title: Discussion on HARQ-ACK feedback over PUCCH and PUSCH; Agenda Item: 7.2.6.1.2; Source: Fujitsu; Document for: Discussion/Decision; Location and Date: Spokane, USA, Nov. 12-16, 2018, consisting of 6 pages.
3GPP TR 38.824 V16.0.0; 3rd Generation Partnership Project; Technical Specification Group Radio Access Network; Study on physical layer enhancements for NR ultra-reliable and low latency case (URLLC) (Release 16); Mar. 2019, consisting of 78 pages.
3GPP TS 38.213 V15.6.0; 3rd Generation Partnership Project; Technical Specification Group Radio Access Network; NR; Physical layer procedures for control (Release 15); Jun. 2019, consisting of 107 pages.
3GPP TS 38.331 V15.6.0; 3rd Generation Partnership Project; Technical Specification Group Radio Access Network; NR; Radio Resource Control (RRC) protocol specification (Release 15); Jun. 2019, consisting of 519 pages.

* cited by examiner

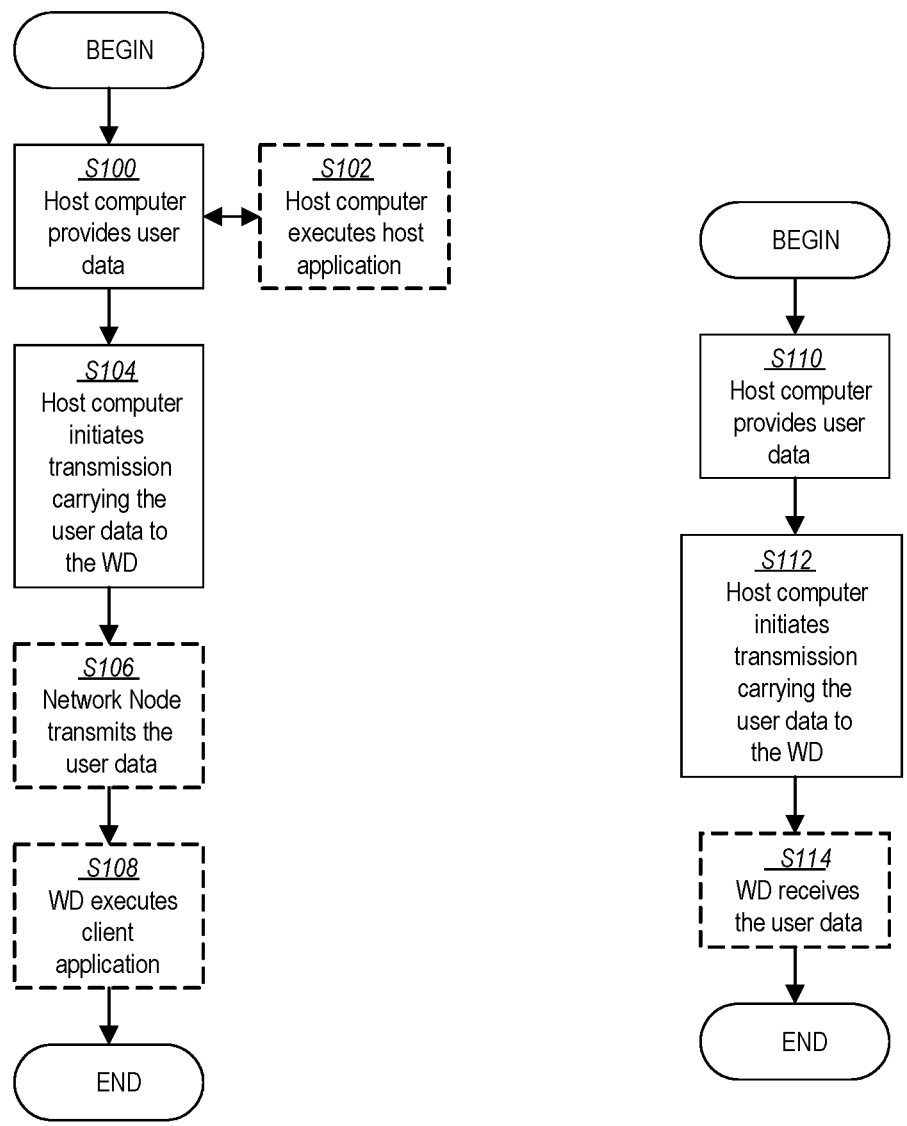

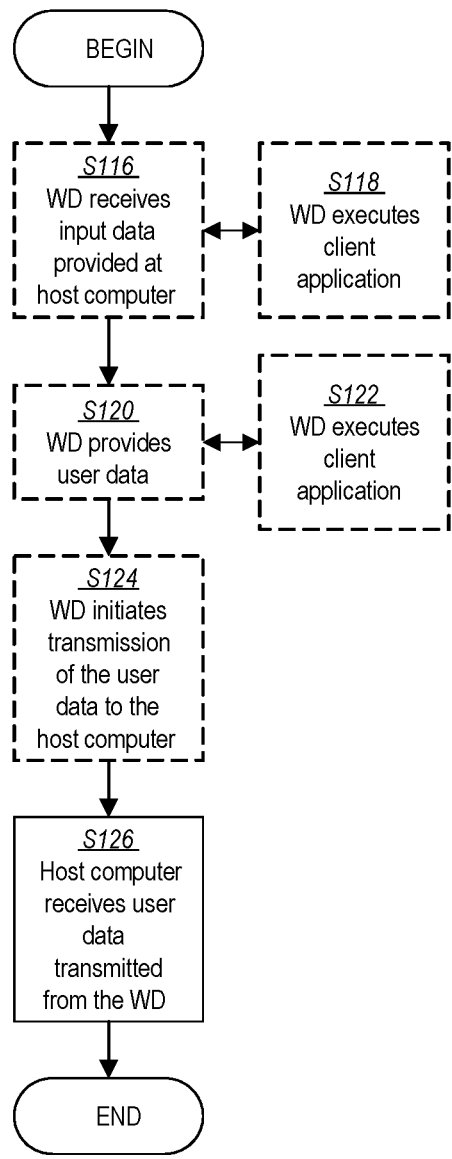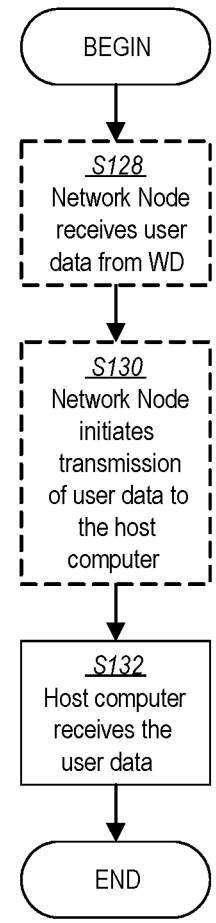
FIG. 5
FIG. 6

PRE-EMPTION PRIORITY LEVEL FOR UPLINK CONTROL INFORMATION (UCI) AND PHYSICAL UPLINK SHARED CHANNEL (PUSCH) CONFLICT RESOLUTION

CROSS-REFERENCE TO RELATED APPLICATIONS

This application is a Submission Under 35 U.S.C. § 371 for U.S. National Stage Patent Application of International Application No.: PCT/EP2020/070274, filed Jul. 17, 2020 entitled "PRE-EMPTION PRIORITY LEVEL FOR UPLINK CONTROL INFORMATION (UCI) AND PHYSICAL UPLINK SHARED CHANNEL (PUSCH) CONFLICT RESOLUTION," which claims priority to U.S. Provisional Application No. 62/875,622, filed Jul. 18, 2019, entitled "PRE-EMPTION PRIORITY LEVEL FOR UCI/PUSCH CONFLICT RESOLUTION," the entireties of both of which are incorporated herein by reference.

TECHNICAL FIELD

The present disclosure relates to wireless communications, and in particular, to pre-emption priority levels for Uplink Control Information (UCI) and/or Physical Uplink Shared Channel (PUSCH) conflict resolution.

BACKGROUND

Ultra-reliable and low latency communication (URLLC) is one of the use cases for $3^{rd}$ Generation Partnership Project (3GPP) 5G New Radio (NR). URLLC has strict requirements on transmission reliability and latency, e.g., 99.9999% reliability within 1 millisecond (ms) one-way latency. In NR Release 15 (Rel-15), several new features and enhancements were introduced to support these requirements. In Release 16 (Rel-16), standardization efforts are focused on further enhancing URLLC system performance as well as ensuring reliable and efficient coexistent of URLLC and other NR use cases. One example scenario is when both enhanced mobile broadband (eMBB) and URLLC services are run within the same wireless device (WD).

In Rel-15, out-of-order Hybrid Automatic Repeat reQuest Acknowledgement (HARQ-ACK) and Physical Uplink Shared Channel (PUSCH) scheduling are not supported. However, out-of-order HARQ-ACK and PUSCH scheduling may be included in the work item for 3GPP Rel-16 (e.g., Section 6.4.2, Technical Specification (TS) 38.824, version 16.0.0).

SUMMARY

Some embodiments of the present disclosure advantageously provide methods and apparatuses for pre-emption priority levels for Uplink Control Information (UCI) and/or Physical Uplink Shared Channel (PUSCH) conflict resolution.

In one embodiment, a method implemented in a network node includes indicating to a wireless device (WD) a priority associated with at least one uplink (UL) channel, and receiving at least one UL signal based at least in part on the indicated priority.

In another embodiment, a method implemented in a WD includes determining a priority associated with at least one of at least two uplink (UL) channels, and resolving a conflict between the at least two uplink channels based at least in part on the determined priority.

According to an aspect of the present disclosure, a method implemented in a network node configured to communicate with a wireless device is provided. The method includes indicating to the wireless device a pre-emption priority level associated with an uplink channel; and receiving an uplink signal based at least in part on the indicated pre-emption priority level.

In some embodiments of this aspect, the pre-emption priority level is configured to allow the wireless device to resolve a conflict between the uplink channel associated with the pre-emption priority level and at least one other uplink channel for a same uplink resource. In some embodiments of this aspect, the uplink channel associated with the indicated pre-emption priority level is one of a physical uplink control channel, PUCCH, and a physical uplink shared channel, PUSCH. In some embodiments of this aspect, the pre-emption priority level is associated with at least one uplink control information, UCI.

In some embodiments of this aspect, the at least one UCI includes at least one of a Hybrid Automatic Repeat reQuest, HARQ, acknowledgement, ACK, a channel state information, CSI, and a scheduling request, SR. In some embodiments of this aspect, the pre-emption priority level is associated with at least one logical channel, LCH. In some embodiments of this aspect, the indicating the pre-emption priority level comprises indicating the pre-emption priority level in at least a downlink control information, DCI, message. In some embodiments of this aspect, the indicating the pre-emption priority level further comprises transmitting a field indicating the pre-emption priority level for a Hybrid Automatic Repeat reQuest, HARQ, acknowledgement, ACK, the field included in the DCI message, the DCI message one of scheduling and activating a physical downlink shared channel, PDSCH, to which the HARQ ACK is associated.

In some embodiments of this aspect, the indicating the pre-emption priority level comprises indicating the pre-emption priority level in at least a field within a logical channel configuration information element, IE. In some embodiments of this aspect, the field within the logical channel configuration IE is a priority field, the pre-emption priority level being derived from a value in the priority field. In some embodiments of this aspect, the field within the logical channel configuration IE is a pre-emption priority level field, the pre-emption priority level field being different from a priority field in the logical channel configuration IE.

In some embodiments of this aspect, the indicating the pre-emption priority level comprises indicating the pre-emption priority level in at least one of: a beta offset indicator; a radio resource control, RRC, signaling; a field within a channel state information report configuration information element, IE; a beta factors field in a physical uplink shared channel, PUSCH, configuration information element, IE; and a multiple Hybrid Automatic Repeat reQuest, HARQ, acknowledgments, ACKs, physical uplink control channel, PUCCH, resource list parameter indicating a pre-emption priority level for each of the multiple HARQ ACKs.

In some embodiments of this aspect, the method further includes transmitting a field indicating at least one set of logical channels, LCHs, that are allowed to use an uplink grant for a physical uplink shared channel, PUSCH. In some embodiments of this aspect, the uplink grant is one of an uplink configured grant and a dynamic grant and the field indicating the at least one set of LCHs is in one of a radio resource control, RRC, configuration and a downlink control information, DCI, message. In some embodiments of this aspect, the field indicating the at least one set of LCHs is one of a priority field and a pre-emption priority level field in a logical channel configuration information element, IE.

In some embodiments of this aspect, the method further includes determining the at least one set of LCHs that are allowed to use the uplink grant based at least in part on at least one of a downlink control information, DCI, message, a predefined rule, a transmission parameter and a cell or carrier indicated by the uplink grant. In some embodiments of this aspect, the method further includes configuring the wireless device with a first rule for when a pre-emption priority level of an uplink control information, UCI, and a pre-emption priority level of a physical uplink shared channel, PUSCH, are equal and a second rule for when the pre-emption priority level of the UCI and the pre-emption priority level of the PUSCH are not equal.

In some embodiments of this aspect, receiving the uplink signal based at least in part on the indicated pre-emption priority level further comprises receiving the uplink signal according to the uplink channel associated with the indicated pre-emption priority level being one of transmitted, multiplexed, dropped and punctured based at least in part on the indicated pre-emption priority level. In some embodiments of this aspect, the uplink signal includes multiple Hybrid Automatic Repeat reQuest, HARQ, acknowledgments, ACKs, multiplexed according to $O_{ACK} = \Sigma_{PPL=1}^{N_{ACK}^{Total}}$, and $O_{ACK,PPL}$ represents a number of HARQ ACK information bits of priority value n and $N_{ACK}^{total}$ represents a number of pre-emption priority levels.

According to another aspect of the present disclosure, a method implemented in a wireless device configured to communicate with a network node is provided. The method includes determining a pre-emption priority level associated with an uplink channel of at least two uplink channels; and resolving a conflict between the at least two uplink channels based at least in part on the determined pre-emption priority level.

In some embodiments of this aspect, determining the pre-emption priority level comprises determining the pre-emption priority level based at least in part on receiving an indication of the pre-emption priority level from the network node. In some embodiments of this aspect, the method further includes transmitting an uplink signal according to a resolution of the conflict, the conflict being between the at least two uplink channels for a same uplink resource. In some embodiments of this aspect, transmitting the uplink signal according to the resolution of the conflict further comprises transmitting the uplink signal according to the uplink channel being one of transmitted, multiplexed, dropped and punctured based at least in part on the determined pre-emption priority level.

In some embodiments of this aspect, the uplink signal includes multiple Hybrid Automatic Repeat reQuest, HARQ, acknowledgments, ACKs, multiplexed according to $O_{ACK} = \Sigma_{PPL=1}^{N_{ACK}^{total}} O_{ACK,PPL}$, and $O_{ACK,PPL}$ represents a number of HARQ ACK information bits of priority value n and $N_{ACK}^{total}$ represents a number of pre-emption priority levels. In some embodiments of this aspect, resolving the conflict between the at least two uplink channels is further based on whether a timeline for uplink control information, UCI, multiplexing permits the wireless device to multiplex the at least two uplink channels. In some embodiments of this aspect, resolving the conflict between the at least two uplink channels further comprises when the pre-emption priority levels of the at least two uplink channels are a same, transmit the earliest uplink channel of the at least two uplink channels and drop the other of the at least two uplink channels.

In some embodiments of this aspect, the uplink channel associated with the determined pre-emption priority level is one of a physical uplink control channel, PUCCH, and a physical uplink shared channel, PUSCH. In some embodiments of this aspect, the pre-emption priority level is associated with at least one uplink control information, UCI. In some embodiments of this aspect, the at least one UCI includes at least one of a Hybrid Automatic Repeat reQuest, HARQ, acknowledgement, ACK, a channel state information, CSI, and a scheduling request, SR. In some embodiments of this aspect, the pre-emption priority level is associated with at least one logical channel, LCH.

In some embodiments of this aspect, the determining the pre-emption priority level comprises determining the pre-emption priority level based at least in part on an indication of the pre-emption priority level in at least a downlink control information, DCI, message. In some embodiments of this aspect, the indication of the pre-emption priority level is included in a field in the DCI message, the field indicating the pre-emption priority level for a Hybrid Automatic Repeat reQuest, HARQ, acknowledgement, ACK, and the DCI message one of scheduling and activating a physical downlink shared channel, PDSCH, to which the HARQ ACK is associated. In some embodiments of this aspect, the determining the pre-emption priority level comprises determining the pre-emption priority level based at least in part on an indication of the pre-emption priority level in at least a field within a logical channel configuration information element, IE.

In some embodiments of this aspect, the field within the logical channel configuration IE is a priority field, the pre-emption priority level being derived from a value in the priority field. In some embodiments of this aspect, the field within the logical channel configuration IE is a pre-emption priority level field, the pre-emption priority level field being different from a priority field in the logical channel configuration IE. In some embodiments of this aspect, determining the pre-emption priority level comprises determining the pre-emption priority level based at least in part on an indication of the pre-emption priority level received from the network node in at least one of: a beta offset indicator; a radio resource control, RRC, signaling; a field within a channel state information report configuration information element, IE; a beta factors field in a physical uplink shared channel, PUSCH, configuration information element, IE; and a multiple Hybrid Automatic Repeat reQuest, HARQ, acknowledgments, ACKs, physical uplink control channel, PUCCH, resource list parameter indicating a pre-emption priority level for each of the multiple HARQ ACKs.

In some embodiments of this aspect, the method further includes receiving a field indicating at least one set of logical channels, LCHs, that are allowed to use an uplink grant for a physical uplink shared channel, PUSCH. In some embodiments of this aspect, the uplink grant is one of an uplink configured grant and a dynamic grant and the field indicating the at least one set of LCHs is in one of a radio resource control, RRC, configuration and a downlink control information, DCI, message. In some embodiments of this aspect, the field indicating the at least one set of LCHs is one of a priority field and a pre-emption priority level field in a logical channel configuration information element, IE. In some embodiments of this aspect, resolving the conflict between the at least two uplink channels based at least in part on the determined pre-emption priority level comprises resolving the conflict according a first rule for when a pre-emption priority level of an uplink control information, UCI, and a pre-emption priority level of a physical uplink shared channel, PUSCH, are equal and a second rule for when the pre-emption priority level of the UCI and the pre-emption priority level of the PUSCH are not equal.

According to yet another aspect of the present disclosure, a network node configured to communicate with a wireless device is provided. The network node includes processing circuitry. The processing circuitry is configured to cause the network node to indicate to the wireless device a pre-emption priority level associated with an uplink channel; and receive an uplink signal based at least in part on the indicated pre-emption priority level.

In some embodiments of this aspect, the pre-emption priority level is configured to allow the wireless device to resolve a conflict between the uplink channel associated with the pre-emption priority level and at least one other uplink channel for a same uplink resource. In some embodiments of this aspect, the uplink channel associated with the indicated pre-emption priority level is one of a physical uplink control channel, PUCCH, and a physical uplink shared channel, PUSCH. In some embodiments of this aspect, the pre-emption priority level is associated with at least one uplink control information, UCI. In some embodiments of this aspect, the at least one UCI includes at least one of a Hybrid Automatic Repeat reQuest, HARQ, acknowledgement, ACK, a channel state information, CSI, and a scheduling request, SR.

In some embodiments of this aspect, the pre-emption priority level is associated with at least one logical channel, LCH. In some embodiments of this aspect, the processing circuitry is configured to cause the network node to indicate the pre-emption priority level by being configured to cause the network node to indicate the pre-emption priority level in at least a downlink control information, DCI, message. In some embodiments of this aspect, the processing circuitry is configured to cause the network node to indicate the pre-emption priority level by being further configured to cause the network node to transmit a field indicating the pre-emption priority level for a Hybrid Automatic Repeat reQuest, HARQ, acknowledgement, ACK, the field included in the DCI message, the DCI message one of scheduling and activating a physical downlink shared channel, PDSCH, to which the HARQ ACK is associated.

In some embodiments of this aspect, the processing circuitry is configured to cause the network node to indicate the pre-emption priority level by being configured to cause the network node to indicate the pre-emption priority level in at least a field within a logical channel configuration information element, IE. In some embodiments of this aspect, the field within the logical channel configuration IE is a priority field, the pre-emption priority level being derived from a value in the priority field. In some embodiments of this aspect, the field within the logical channel configuration IE is a pre-emption priority level field, the pre-emption priority level field being different from a priority field in the logical channel configuration IE. In some embodiments of this aspect, the processing circuitry is configured to cause the network node to indicate the pre-emption priority level by being configured to cause the network node to indicate the pre-emption priority level in at least one of: a beta offset indicator; a radio resource control, RRC, signaling; a field within a channel state information report configuration information element, IE; a beta factors field in a physical uplink shared channel, PUSCH, configuration information element, IE; and a multiple Hybrid Automatic Repeat reQuest, HARQ, acknowledgments, ACKs, physical uplink control channel, PUCCH, resource list parameter indicating a pre-emption priority level for each of the multiple HARQ ACKs.

In some embodiments of this aspect, the processing circuitry is further configured to cause the network node to transmit a field indicating at least one set of logical channels, LCHs, that are allowed to use an uplink grant for a physical uplink shared channel, PUSCH. In some embodiments of this aspect, the uplink grant is one of an uplink configured grant and a dynamic grant and the field indicating the at least one set of LCHs is in one of a radio resource control, RRC, configuration and a downlink control information, DCI, message. In some embodiments of this aspect, the field indicating the at least one set of LCHs is one of a priority field and a pre-emption priority level field in a logical channel configuration information element, IE.

In some embodiments of this aspect, the processing circuitry is further configured to cause the network node to determine the at least one set of LCHs that are allowed to use the uplink grant based at least in part on at least one of a downlink control information, DCI, message, a predefined rule, a transmission parameter and a cell or carrier indicated by the uplink grant. In some embodiments of this aspect, the processing circuitry is further configured to cause the network node to configure the wireless device with a first rule for when a pre-emption priority level of an uplink control information, UCI, and a pre-emption priority level of a physical uplink shared channel, PUSCH, are equal and a second rule for when the pre-emption priority level of the UCI and the pre-emption priority level of the PUSCH are not equal.

In some embodiments of this aspect, the processing circuitry is configured to cause the network node receive the uplink signal based at least in part on the indicated pre-emption priority level by being configured to cause the network node to receive the uplink signal according to the uplink channel associated with the indicated pre-emption priority level being one of transmitted, multiplexed, dropped and punctured based at least in part on the indicated pre-emption priority level. In some embodiments of this aspect, the uplink signal includes multiple Hybrid Automatic Repeat reQuest, HARQ, acknowledgments, ACKs, multiplexed according to $O_{ACK} = \Sigma_{PPL=1}^{N_{ACK}^{total}} O_{ACK,PPL}$, and $O_{ACK,PPL}$ represents a number of HARQ ACK information bits of priority value n and $N_{ACK}^{total}$ represents a number of pre-emption priority levels.

According to another aspect of the present disclosure, a wireless device configured to communicate with a network node is provided. The wireless device includes processing circuitry. The processing circuitry is configured to cause the wireless device to determine a pre-emption priority level associated with an uplink channel of at least two uplink channels; and resolve a conflict between the at least two uplink channels based at least in part on the determined pre-emption priority level. In some embodiments of this aspect, the processing circuitry is configured to cause the wireless device to determine the pre-emption priority level by being configured to cause the wireless device to determine the pre-emption priority level based at least in part on receiving an indication of the pre-emption priority level from the network node. In some embodiments of this aspect, the processing circuitry is further configured to cause the wireless device to transmit an uplink signal according to a resolution of the conflict, the conflict being between the at least two uplink channels for a same uplink resource.

In some embodiments of this aspect, the processing circuitry is configured to cause the wireless device to transmit the uplink signal according to the resolution of the conflict further by being configured to cause the wireless device to transmit the uplink signal according to the uplink channel being one of transmitted, multiplexed, dropped and punctured based at least in part on the determined pre-emption priority level. In some embodiments of this aspect, the uplink signal includes multiple Hybrid Automatic Repeat reQuest, HARQ, acknowledgments, ACKs, multiplexed according to $O_{ACK} = \Sigma_{PPL=1}^{N_{ACK}^{total}} O_{ACK,PPL}$, and $O_{ACK,PPL}$ represents a number of HARQ ACK information bits of priority value n and represents a number of pre-emption priority levels.

In some embodiments of this aspect, the processing circuitry is configured to cause the wireless device to resolve the conflict between the at least two uplink channels further based on whether a timeline for uplink control information, UCI, multiplexing permits the wireless device to multiplex the at least two uplink channels. In some embodiments of this aspect, the processing circuitry is configured to cause the wireless device to resolve the conflict between the at least two uplink channels by being configured to cause the wireless device to when the pre-emption priority levels of the at least two uplink channels are a same, transmit the earliest uplink channel of the at least two uplink channels and drop the other of the at least two uplink channels.

In some embodiments of this aspect, the uplink channel associated with the determined pre-emption priority level is one of a physical uplink control channel, PUCCH, and a physical uplink shared channel, PUSCH. In some embodiments of this aspect, the pre-emption priority level is associated with at least one uplink control information, UCI. In some embodiments of this aspect, the at least one UCI includes at least one of a Hybrid Automatic Repeat reQuest, HARQ, acknowledgement, ACK, a channel state information, CSI, and a scheduling request, SR. In some embodiments of this aspect, the pre-emption priority level is associated with at least one logical channel, LCH.

In some embodiments of this aspect, the processing circuitry is configured to cause the wireless device to determine the pre-emption priority level by being configured to cause the wireless device to determine the pre-emption priority level based at least in part on an indication of the pre-emption priority level in at least a downlink control information, DCI, message. In some embodiments of this aspect, the indication of the pre-emption priority level is included in a field in the DCI message, the field indicating the pre-emption priority level for a Hybrid Automatic Repeat reQuest, HARQ, acknowledgement, ACK, and the DCI message one of scheduling and activating a physical downlink shared channel, PDSCH, to which the HARQ ACK is associated. In some embodiments of this aspect, the processing circuitry is configured to cause the wireless device to determine the pre-emption priority level by being configured to cause the wireless device to determine the pre-emption priority level based at least in part on an indication of the pre-emption priority level in at least a field within a logical channel configuration information element, IE.

In some embodiments of this aspect, the field within the logical channel configuration IE is a priority field, the pre-emption priority level being derived from a value in the priority field. In some embodiments of this aspect, the field within the logical channel configuration IE is a pre-emption priority level field, the pre-emption priority level field being different from a priority field in the logical channel configuration IE. In some embodiments of this aspect, the processing circuitry is configured to cause the wireless device to determine the pre-emption priority level by being configured to cause the wireless device to determine the pre-emption priority level based at least in part on an indication of the pre-emption priority level received from the network node in at least one of: a beta offset indicator; a radio resource control, RRC, signaling; a field within a channel state information report configuration information element, IE; a beta factors field in a physical uplink shared channel, PUSCH, configuration information element, IE; and a multiple Hybrid Automatic Repeat reQuest, HARQ, acknowledgments, ACKs, physical uplink control channel, PUCCH, resource list parameter indicating a pre-emption priority level for each of the multiple HARQ ACKs.

In some embodiments of this aspect, the processing circuitry is further configured to cause the wireless device to receive a field indicating at least one set of logical channels, LCHs, that are allowed to use an uplink grant for a physical uplink shared channel, PUSCH. In some embodiments of this aspect, the uplink grant is one of an uplink configured grant and a dynamic grant and the field indicating the at least one set of LCHs is in one of a radio resource control, RRC, configuration and a downlink control information, DCI, message. In some embodiments of this aspect, the field indicating the at least one set of LCHs is one of a priority field and a pre-emption priority level field in a logical channel configuration information element, IE.

In some embodiments of this aspect, the processing circuitry is configured to cause the wireless device to resolve the conflict between the at least two uplink channels based at least in part on the determined pre-emption priority level by being configured to cause the wireless device to resolve the conflict according a first rule for when a pre-emption priority level of an uplink control information, UCI, and a pre-emption priority level of a physical uplink shared channel, PUSCH, are equal and a second rule for when the pre-emption priority level of the UCI and the pre-emption priority level of the PUSCH are not equal.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart illustrating exemplary methods implemented in a communication system including a host computer, a network node and a wireless device for executing a client application at a wireless device according to some embodiments of the present disclosure;

FIG. 4 is a flowchart illustrating exemplary methods implemented in a communication system including a host computer, a network node and a wireless device for receiving user data at a wireless device according to some embodiments of the present disclosure;

FIG. 5 is a flowchart illustrating exemplary methods implemented in a communication system including a host computer, a network node and a wireless device for receiving user data from the wireless device at a host computer according to some embodiments of the present disclosure;

FIG. 6 is a flowchart illustrating exemplary methods implemented in a communication system including a host computer, a network node and a wireless device for receiving user data at a host computer according to some embodiments of the present disclosure;

DETAILED DESCRIPTION

Figure 1:
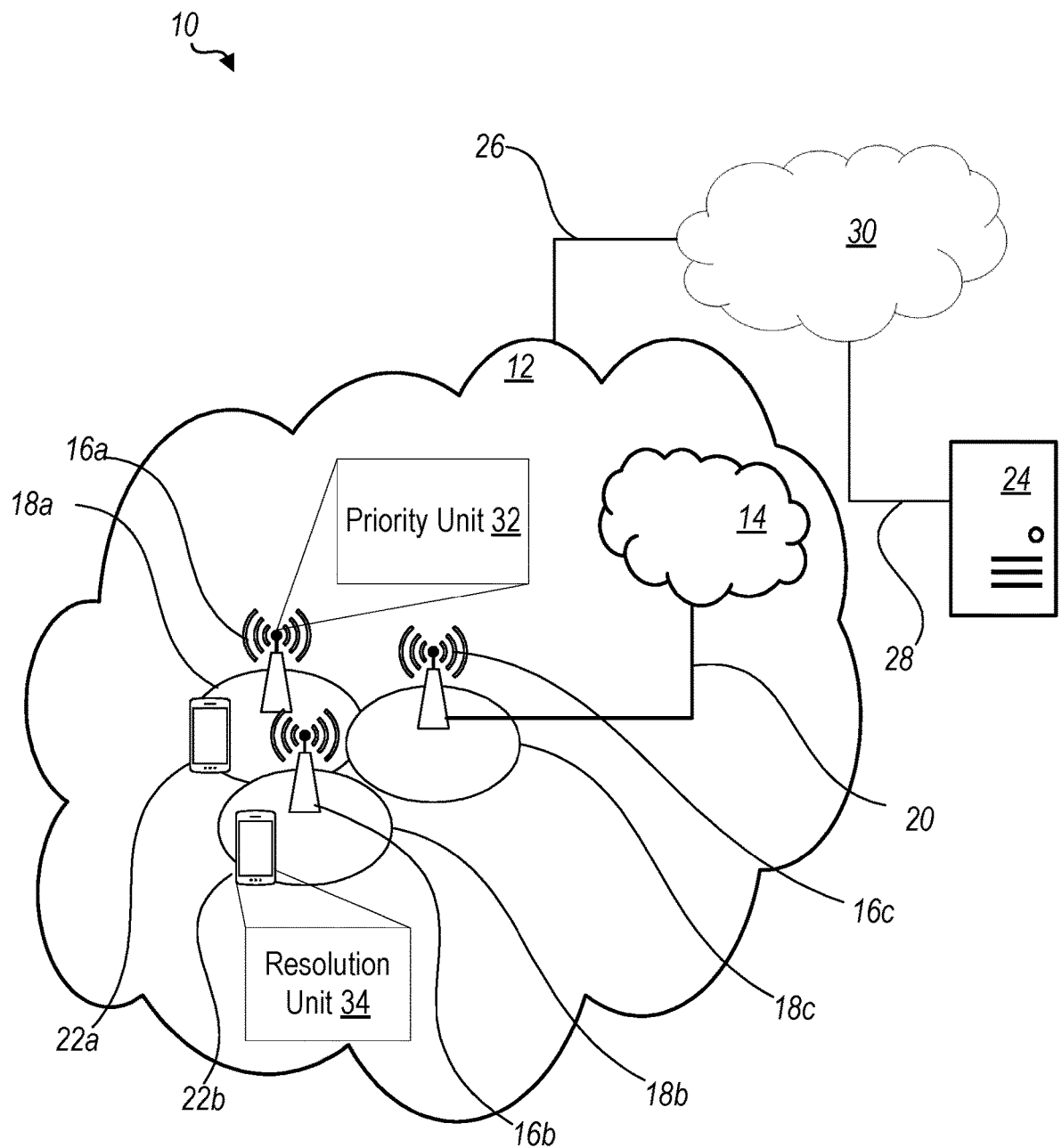
FIG. 1 is a schematic diagram of an exemplary network architecture illustrating a communication system connected via an intermediate network to a host computer according to the principles in the present disclosure.

In addition to out-of-order HARQ-ACK and PUSCH scheduling discussed above there may be support for multiple configured grants. These Rel-16 enhancements may cause conflicts between different PUSCHs, between PUSCH and PUCCH, and also between different PUCCHs. For example, there may be an ongoing PUSCH when it would be preferred to instead make a UCI transmission including a HARQ-ACK associated with a higher priority Physical Downlink Shared Channel (PDSCH) instead. Currently, no solution exists as to how to handle these types of conflicts.

Currently, WD behavior is not defined with respect to how to prioritize, for example, HARQ-ACKs with different priorities on PUCCHs, and/or how to prioritize HARQ-ACK with a different priority versus PUSCH.

Some embodiments of the present disclosure define an intra-WD behavior for conflict resolution for conflicting PUCCHs and/or conflict resolution for PUCCHs and PUSCH. Some of the embodiments in the present disclosure may enhance reliability and latency for prioritized UCI and/or PUSCH as compared with other arrangements that do not provide prioritization.

Before describing in detail exemplary embodiments, it is noted that the embodiments reside primarily in combinations of apparatus components and processing steps related to pre-emption priority levels for Uplink Control Information (UCI) and/or Physical Uplink Shared Channel (PUSCH) conflict resolution. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

In some embodiments, a "conflict" may be considered a conflict as to which channel and/or message and/or information should be transmitted (e.g., by the WD) in one or more uplink resources (e.g., which may have been granted by the network node) when, for example, two or more uplink channels/messages are available to be transmitted by the WD but, for example, only a limited amount of uplink resources have been granted. Thus, in some embodiments, the WD is configured to resolve the conflict by, e.g., prioritizing one or more of the uplink channels/messages based on one or more of the techniques provided in the present disclosure.

Even though the descriptions herein may be explained in the context of one of a Downlink (DL) and an Uplink (UL) communication, it should be understood that the basic principles disclosed may also be applicable to the other of the one of the DL and the UL communication. In some embodiments in this disclosure, the principles may be considered applicable to a transmitter and a receiver. For DL communication, the network node is the transmitter and the receiver is the WD. For the UL communication, the transmitter is the WD and the receiver is the network node.

Although the description herein may be explained in the context of one or more uplink channel, it should be understood that the principles may also be applicable to other channels, such as, for example, a sidelink channel. Any two or more embodiments described in this disclosure may be combined in any way with each other.

The term "signaling" used herein may comprise any of: high-layer signaling (e.g., via Radio Resource Control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

In some embodiments, with puncturing, information related to a physical channel or signal is mapped to resource elements; and in a second step those resource elements that should be empty or carry information related to another physical channel or signal are set to zero and/or replaced by the other channels/signals information. In other words, puncturing may include that the transmitter deletes the modulation symbols (from a first channel) originally mapped to the punctured resource elements and replaces it with modulation symbols corresponding to the second signal. In some embodiments, puncturing may include other steps.

Generally, it may be considered that the network, e.g. a signaling radio node and/or node arrangement, configures a WD, in particular with the transmission resources. A resource may in general be configured with one or more messages. Different resources may be configured with different messages, and/or with messages on different layers or layer combinations. The size of a resource may be represented in symbols and/or subcarriers and/or resource elements and/or physical resource blocks (depending on domain), and/or in number of bits it may carry, e.g. information or payload bits, or total number of bits. The set of resources, and/or the resources of the sets, may pertain to the same carrier and/or bandwidth part, and/or may be located in the same slot, or in neighboring slots.

In some embodiments, control information on one or more resources may be considered to be transmitted in a message having a specific format. A message may comprise or represent bits representing payload information and coding bits, e.g., for error coding.

Receiving (or obtaining) control information may comprise receiving one or more control information messages (e.g., including a priority indication). It may be considered that receiving control signaling comprises demodulating and/or decoding and/or detecting, e.g. blind detection of, one or more messages, in particular a message carried by the control signaling, e.g. based on an assumed set of resources, which may be searched and/or listened for the control information. It may be assumed that both sides of the communication are aware of the configurations, and may determine the set of resources, e.g. based on the reference size.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An indication (e.g., an indication of a priority, an index, an RRC parameter, a table, etc.) generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

Configuring a radio node, in particular a terminal or WD, may refer to the radio node being adapted or caused or set and/or instructed to operate according to the configuration. Configuring may be done by another device, e.g., a network node or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilize, and/or be adapted to utilize, its circuitry/ies for configuring. Allocation information may be considered a form of configuration data. Configuration data may comprise and/or be represented by configuration information, and/or one or more corresponding indications and/or message/s.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have at least two component channels, one for each direction. Examples of channels comprise a channel for low latency and/or high reliability transmission, in particular a channel for Ultra-Reliable Low Latency Communication (URLLC), which may be for control and/or data.

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a priority unit 32 which is configured to indicate to the WD a pre-emption priority level associated with at least one uplink (UL) channel; and receive at least one UL signal based at least in part on the indicated pre-emption priority level.

A wireless device 22 is configured to include a resolution unit 34 which is configured to determine a pre-emption priority level associated with an uplink channel of at least two uplink (UL) channels; and resolve a conflict between the at least two uplink channels based at least in part on the determined pre-emption priority level.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include priority unit 32 configured to perform the network node methods described herein, such as, for example, the methods described with reference to the flowchart in FIG. 7.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a resolution unit 34 configured to the WD methods described herein, such as, for example, the methods described with reference to the flowchart in FIG. 8.

Figure 2:
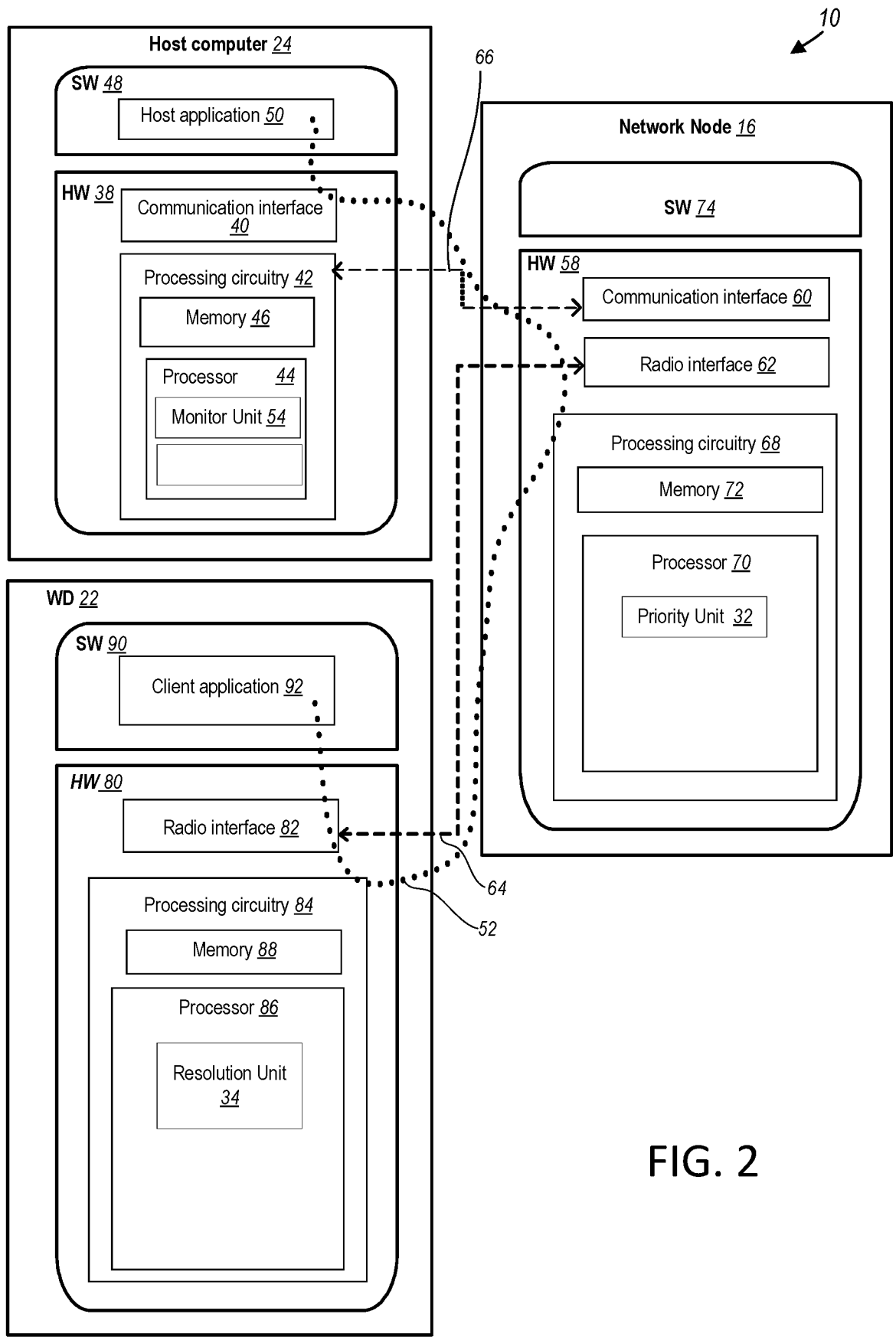
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as priority unit 32, and resolution unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
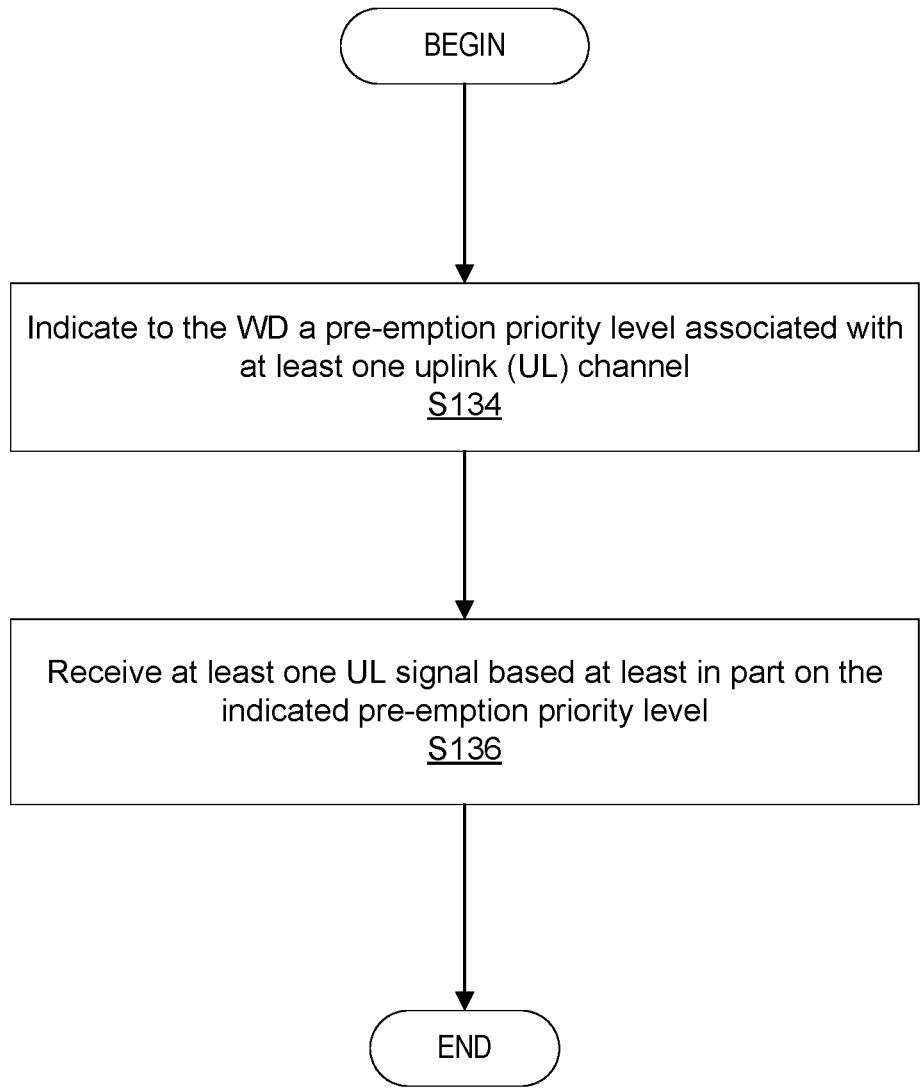
FIG. 7 is a flowchart of an exemplary process in a network node for priority unit according to some embodiments of the present disclosure.

FIG. 7 is a flowchart of an exemplary process in a network node 16 according to some embodiments of the present disclosure. One or more Blocks and/or functions and/or methods performed by the network node 16 may be performed by one or more elements of network node 16 such as by priority unit 32 in processing circuitry 68, processor 70, radio interface 62, etc. according to the example method. The example method includes indicating (Block S134), such as via priority unit 32, processing circuitry 68, processor 70 and/or radio interface 62, to the WD 22 a pre-emption priority level associated with at least one uplink (UL) channel. The method includes receiving (Block S136), such as via priority unit 32, processing circuitry 68, processor 70 and/or radio interface 62, at least one UL signal based at least in part on the indicated pre-emption priority level.

In some embodiments, the pre-emption priority level is configured, such as via priority unit 32, processing circuitry 68, processor 70 and/or radio interface 62, to allow the wireless device to resolve a conflict between the uplink channel associated with the pre-emption priority level and at least one other uplink channel for a same uplink resource. In some embodiments, the uplink channel associated with the indicated pre-emption priority level is one of a physical uplink control channel, PUCCH, and a physical uplink shared channel, PUSCH. In some embodiments, the pre-emption priority level is associated with at least one uplink control information, UCI.

In some embodiments, the at least one UCI includes at least one of a Hybrid Automatic Repeat reQuest, HARQ, acknowledgement, ACK, a channel state information, CSI, and a scheduling request, SR. In some embodiments, the pre-emption priority level is associated with at least one logical channel, LCH. In some embodiments, the indicating the pre-emption priority level comprises indicating, such as via priority unit 32, processing circuitry 68, processor 70 and/or radio interface 62, the pre-emption priority level in at least a downlink control information, DCI, message. In some embodiments, the indicating the pre-emption priority level further comprises transmitting, such as via priority unit 32, processing circuitry 68, processor 70 and/or radio interface 62, a field indicating the pre-emption priority level for a Hybrid Automatic Repeat reQuest, HARQ, acknowledgement, ACK, the field included in the DCI message, the DCI message one of scheduling and activating a physical downlink shared channel, PDSCH, to which the HARQ ACK is associated.

In some embodiments, the indicating the pre-emption priority level comprises indicating, such as via priority unit 32, processing circuitry 68, processor 70 and/or radio interface 62, the pre-emption priority level in at least a field within a logical channel configuration information element, IE. In some embodiments, the field within the logical channel configuration IE is a priority field, the pre-emption priority level being derived from a value in the priority field. In some embodiments, the field within the logical channel configuration IE is a pre-emption priority level field, the pre-emption priority level field being different from a priority field in the logical channel configuration IE. In some embodiments, the indicating the pre-emption priority level comprises indicating, such as via priority unit 32, processing circuitry 68, processor 70 and/or radio interface 62, the pre-emption priority level in at least one of: a beta offset indicator; a radio resource control, RRC, signaling; a field within a channel state information report configuration information element, IE; a beta factors field in a physical uplink shared channel, PUSCH, configuration information element, IE; and a multiple Hybrid Automatic Repeat reQuest, HARQ, acknowledgments, ACKs, physical uplink control channel, PUCCH, resource list parameter indicating a pre-emption priority level for each of the multiple HARQ ACKs.

In some embodiments, the method further includes transmitting, such as via priority unit 32, processing circuitry 68, processor 70 and/or radio interface 62, a field indicating at least one set of logical channels, LCHs, that are allowed to use an uplink grant for a physical uplink shared channel, PUSCH. In some embodiments, the uplink grant is one of an uplink configured grant and a dynamic grant and the field indicating the at least one set of LCHs is in one of a radio resource control, RRC, configuration and a downlink control information, DCI, message, such as via priority unit 32, processing circuitry 68, processor 70 and/or radio interface 62, the field indicating the at least one set of LCHs is one of a priority field and a pre-emption priority level field in a logical channel configuration information element, IE.

In some embodiments, the method further includes determining, such as via priority unit 32, processing circuitry 68, processor 70 and/or radio interface 62, the at least one set of LCHs that are allowed to use the uplink grant based at least in part on at least one of a downlink control information, DCI, message, a predefined rule, a transmission parameter and a cell or carrier indicated by the uplink grant. In some embodiments, the method further includes configuring, such as via priority unit 32, processing circuitry 68, processor 70 and/or radio interface 62, the wireless device with a first rule for when a pre-emption priority level of an uplink control information, UCI, and a pre-emption priority level of a physical uplink shared channel, PUSCH, are equal and a second rule for when the pre-emption priority level of the UCI and the pre-emption priority level of the PUSCH are not equal.

In some embodiments, receiving the uplink signal based at least in part on the indicated pre-emption priority level further comprises receiving, such as via priority unit 32, processing circuitry 68, processor 70 and/or radio interface 62, the uplink signal according to the uplink channel associated with the indicated pre-emption priority level being one of transmitted, multiplexed, dropped and punctured based at least in part on the indicated pre-emption priority level. In some embodiments, the uplink signal includes multiple Hybrid Automatic Repeat reQuest, HARQ, acknowledgments, ACKs, multiplexed according to $O_{ACK} = \Sigma_{PPL=1}^{N_{ACK}^{total}} O_{ACK,PPL}$, and $O_{ACK,PPL}$ represents a number of HARQ ACK information bits of priority value n and $N_{ACK}^{total}$ represents a number of pre-emption priority levels.

In some embodiments, the priority is a pre-emption priority level. In some embodiments, indicating the priority is in at least one of a downlink control information (DCI) message, radio resource control (RRC) signaling, and a logical channel configuration. In some embodiments, the at least two uplink channels include at least one of a physical uplink shared channel (PUSCH), a physical uplink control channel (PUCCH), uplink control information (UCI), channel state information (CSI) and Hybrid Automatic Repeat reQuest (HARQ). In some embodiments, the indicating the priority further includes transmitting, such as via priority unit 32, processing circuitry 68, processor 70 and/or radio interface 62, a field indicating a pre-emption priority level. In some embodiments, the method includes transmitting, such as via priority unit 32, processing circuitry 68, processor 70 and/or radio interface 62, a field indicating at least one set of logical channels that are allowed to use an uplink grant.

Figure 8:
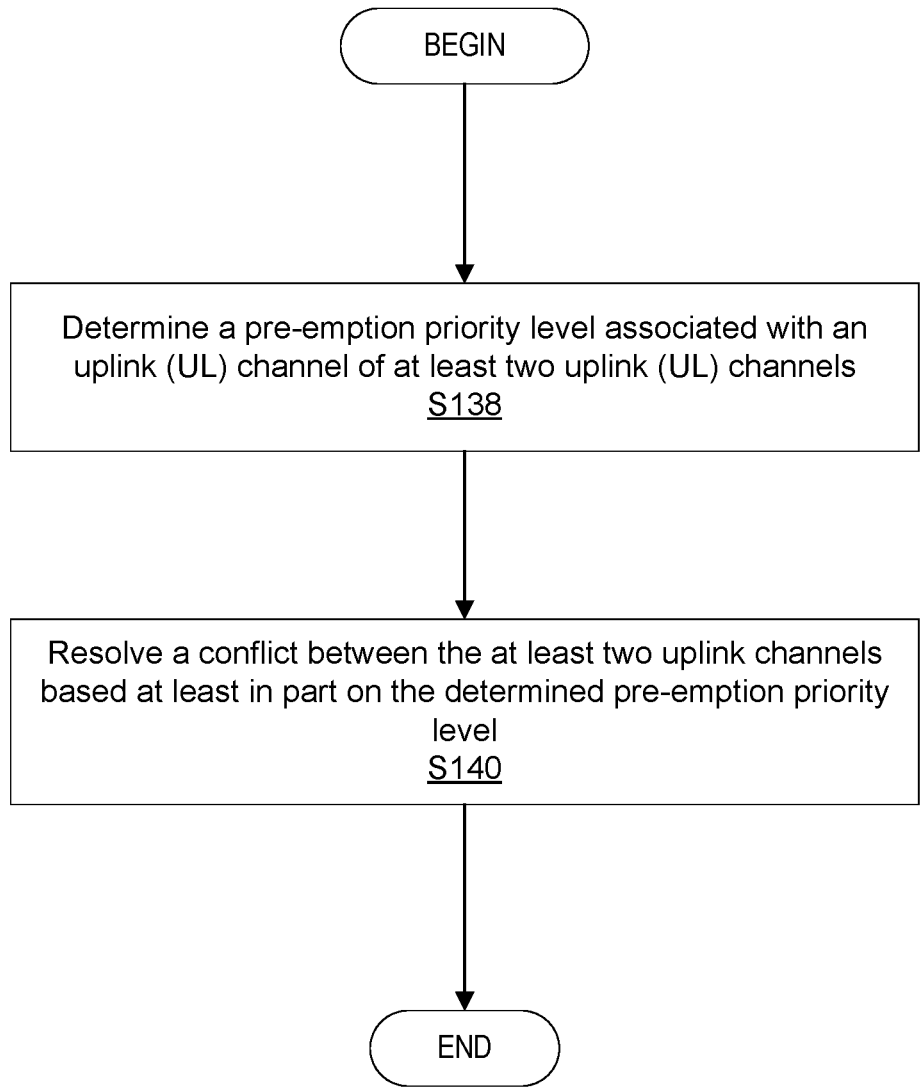
FIG. 8 is a flowchart of an exemplary process in a wireless device for resolution unit according to some embodiments of the present disclosure.

FIG. 8 is a flowchart of an exemplary process in a wireless device 22 according to some embodiments of the present disclosure. One or more Blocks and/or functions and/or methods performed by WD 22 may be performed by one or more elements of WD 22 such as by resolution unit 34 in processing circuitry 84, processor 86, radio interface 82, etc. The example method includes determining (Block S138), such as via resolution unit 34, processing circuitry 84, processor 86 and/or radio interface 82, a pre-emption priority level associated with an uplink channel of at least two uplink (UL) channels. The method includes resolving (Block S140), such as via resolution unit 34, processing circuitry 84, processor 86 and/or radio interface 82, a conflict between the at least two uplink channels based at least in part on the determined pre-emption priority level.

In some embodiments, determining the pre-emption priority level comprises determining, such as via resolution unit 34, processing circuitry 84, processor 86 and/or radio interface 82, the pre-emption priority level based at least in part on receiving an indication of the pre-emption priority level from the network node. In some embodiments, the method further includes transmitting, such as via resolution unit 34, processing circuitry 84, processor 86 and/or radio interface 82, an uplink signal according to a resolution of the conflict, the conflict being between the at least two uplink channels for a same uplink resource. In some embodiments, transmitting the uplink signal according to the resolution of the conflict further comprises transmitting, such as via resolution unit 34, processing circuitry 84, processor 86 and/or radio interface 82, the uplink signal according to the uplink channel being one of transmitted, multiplexed, dropped and punctured based at least in part on the determined pre-emption priority level.

In some embodiments, the uplink signal includes multiple Hybrid Automatic Repeat reQuest, HARQ, acknowledgments, ACKs, multiplexed according to $O_{ACK} = \Sigma_{PPL=1}^{N_{ACK}^{total}} O_{ACK,PPL}$, and $O_{ACK,PPL}$ represents a number of HARQ ACK information bits of priority value n and $N_{ACK}^{total}$ represents a number of pre-emption priority levels. In some embodiments, resolving the conflict between the at least two uplink channels is further based on whether a timeline for uplink control information, UCI, multiplexing permits the wireless device to multiplex the at least two uplink channels. In some embodiments, resolving the conflict between the at least two uplink channels further comprises when the pre-emption priority levels of the at least two uplink channels are a same, transmit, such as via resolution unit 34, processing circuitry 84, processor 86 and/or radio interface 82, the earliest uplink channel of the at least two uplink channels and drop the other of the at least two uplink channels.

In some embodiments, the uplink channel associated with the determined pre-emption priority level is one of a physical uplink control channel, PUCCH, and a physical uplink shared channel, PUSCH. In some embodiments, the pre-emption priority level is associated with at least one uplink control information, UCI. In some embodiments, the at least one UCI includes at least one of a Hybrid Automatic Repeat reQuest, HARQ, acknowledgement, ACK, a channel state information, CSI, and a scheduling request, SR. In some embodiments, the pre-emption priority level is associated with at least one logical channel, LCH. In some embodiments, the determining the pre-emption priority level comprises determining, such as via resolution unit 34, processing circuitry 84, processor 86 and/or radio interface 82, the pre-emption priority level based at least in part on an indication of the pre-emption priority level in at least a downlink control information, DCI, message.

In some embodiments, the indication of the pre-emption priority level is included in a field in the DCI message, the field indicating the pre-emption priority level for a Hybrid Automatic Repeat reQuest, HARQ, acknowledgement, ACK, and the DCI message one of scheduling and activating a physical downlink shared channel, PDSCH, to which the HARQ ACK is associated. In some embodiments, the determining the pre-emption priority level comprises determining, such as via resolution unit 34, processing circuitry 84, processor 86 and/or radio interface 82, the pre-emption priority level based at least in part on an indication of the pre-emption priority level in at least a field within a logical channel configuration information element, IE. In some embodiments, the field within the logical channel configuration IE is a priority field, the pre-emption priority level being derived from a value in the priority field.

In some embodiments, the field within the logical channel configuration IE is a pre-emption priority level field, the pre-emption priority level field being different from a priority field in the logical channel configuration IE. In some embodiments, determining the pre-emption priority level comprises determining, such as via resolution unit 34, processing circuitry 84, processor 86 and/or radio interface 82, the pre-emption priority level based at least in part on an indication of the pre-emption priority level received from the network node in at least one of: a beta offset indicator; a radio resource control, RRC, signaling; a field within a channel state information report configuration information element, IE; a beta factors field in a physical uplink shared channel, PUSCH, configuration information element, IE; and a multiple Hybrid Automatic Repeat reQuest, HARQ, acknowledgments, ACKs, physical uplink control channel, PUCCH, resource list parameter indicating a pre-emption priority level for each of the multiple HARQ ACKs.

In some embodiments, the method further includes receiving, such as via resolution unit 34, processing circuitry 84, processor 86 and/or radio interface 82, a field indicating at least one set of logical channels, LCHs, that are allowed to use an uplink grant for a physical uplink shared channel, PUSCH. In some embodiments, the uplink grant is one of an uplink configured grant and a dynamic grant and the field indicating the at least one set of LCHs is in one of a radio resource control, RRC, configuration and a downlink control information, DCI, message. In some embodiments, the field indicating the at least one set of LCHs is one of a priority field and a pre-emption priority level field in a logical channel configuration information element, IE. In some embodiments, resolving the conflict between the at least two uplink channels based at least in part on the determined pre-emption priority level comprises resolving, such as via resolution unit 34, processing circuitry 84, processor 86 and/or radio interface 82, the conflict according a first rule for when a pre-emption priority level of an uplink control information, UCI, and a pre-emption priority level of a physical uplink shared channel, PUSCH, are equal and a second rule for when the pre-emption priority level of the UCI and the pre-emption priority level of the PUSCH are not equal.

In some embodiments, the priority is a pre-emption priority level. In some embodiments, the method further includes transmitting, such as via resolution unit 34, processing circuitry 84, processor 86 and/or radio interface 82, at least one UL signal according to the resolution of the conflict. In some embodiments, the method further includes one of transmitting, dropping and puncturing, such as via resolution unit 34, processing circuitry 84, processor 86 and/or radio interface 82, each of the at least two uplink channels based at least in part on the determined priority. In some embodiments, the determining the priority further includes determining, such as via resolution unit 34, processing circuitry 84, processor 86 and/or radio interface 82, the priority based at least in part on an indication in at least one of a downlink control information (DCI) message, radio resource control (RRC) signaling, and a logical channel configuration. In some embodiments, the at least two uplink channels include at least one of a physical uplink shared channel (PUSCH), a physical uplink control channel (PUCCH), uplink control information (UCI), channel state information (CSI) and Hybrid Automatic Repeat reQuest (HARQ). In some embodiments, the determining the priority further includes determining, such as via resolution unit 34, processing circuitry 84, processor 86 and/or radio interface 82, the priority based at least in part on a field indicating at least one set of logical channels that are allowed to use an uplink grant. In some embodiments, the determining the priority further includes determining, such as via resolution unit 34, processing circuitry 84, processor 86 and/or radio interface 82, the priority based at least in part on a field indicating a pre-emption priority level.

Having generally described arrangements for pre-emption priority level for Uplink Control Information (UCI) and/or Physical Uplink Shared Channel (PUSCH) conflict resolution, more details regarding the functions and processes are described as follows, and which may be implemented by the network node 16, wireless device 22 and/or host computer 24.

In some embodiments, the WD 22 may determine a pre-emption priority level (PPL) for UCI and a PPL for PUSCH.

In some embodiments, for HARQ-ACK, the PPL may be indicated in the DCI scheduling the PDSCH to which the HARQ-ACK is associated. If the HARQ-ACK is associated with a semi-persistently scheduled (SPS)-PDSCH, the PPL may be determined from the activation DCI for the SPS-PDSCH, or from the Radio Resource Control (RRC) configuration. For example, a PPL indicator in DL DCI indicating a PPL or a PPL offset may be indicated according to a table, such as, for example, the example table (Table 1) below:

TABLE 1

PPL indication.

| PPL indicator | Description |
|---|---|
| 0 | First value (or, offset value) of PPL |
| 1 | Second value (or, offset value) of PPL |

In some embodiments, for PUSCH, the PPL may be determined by the WD 22, such as via processing circuitry 84 and/or radio interface 82, from DCI signaling and/or LCH (Logical Channel) configuration or a mapping between the DCI signaled indicator and the available data in the LCH. For example, the PPL may be included as a field in LogicalChannelConfig Information Element (IE) in TS 38.331, version 15.6.0 according to, for example, the bolded part below:

```
-- ASN1START
-- TAG-LOGICALCHANNELCONFIG-START
LogicalChannelConfig ::=        SEQUENCE {
    ul-SpecificParameters       SEQUENCE {
        priority            INTEGER (1..16),
        preemptionPriorityLevel    INTEGER (1..X),
        prioritisedBitRate    ENUMERATED {kBps0, kBps8, kBps16,
kBps32, kBps64, kBps128, kBps256, kBps512,
                    kBps1024, kBps2048, kBps4096, kBps8192,
kBps16384, kBps32768, kBps65536, infinity},
        bucketSizeDuration    ENUMERATED {ms5, ms10, ms20, ms50,
ms100, ms150, ms300, ms500, ms1000,
                    spare7, spare6, spare5, spare4, spare3,
spare2, spare1},
        allowedServingCells    SEQUENCE (SIZE
                    (1..maxNrofServingCells-1))
OF ServCellIndex
                                OPTIONAL, --
PDCP-CADuplication
        allowedSCS-List    SEQUENCE (SIZE (1..maxSCSs)) OF
SubcarrierSpacing    OPTIONAL, -- Need R
        maxPUSCH-Duration    ENUMERATED {ms0p02, ms0p04,
ms0p0625, ms0p125, ms0p25, ms0p5, spare2, spare1}
                                OPTIONAL, -- Need
R
        configuredGrantType1Allowed    ENUMERATED {true}
OPTIONAL, -- Need R
        logicalChannelGroup    INTEGER (0..maxLCG-ID)
OPTIONAL, -- Need R
        schedulingRequestID            OPTIONAL, -- Need R
        logicalChannelSR-Mask        BOOLEAN,
        logicalChannelSR-DelayTimerApplied    BOOLEAN,
        ...,
        bitRateQueryProhibitTimer   ENUMERATED { s0, s0dot4, s0dot8,
s1dot6, s3, s6, s12,s30}    OPTIONAL -- Need R
    }                           OPTIONAL, -- Cond
UL
    ...
}
```

Similar to priority, in one embodiment, an increasing preemptionPriorityLevel value may indicate a lower pre-emption priority level, and this may be assumed in the description below. Alternatively, in some embodiments, decreasing preemptionPriorityLevel value indicates a lower pre-emption priority level.

This (e.g., using a PPL field in a LogicalChannelConfig IE) may enable the WD 22, such as via processing circuitry 84 and/or radio interface 82, to determine the PPL based on which LCHs are multiplexed on the PUSCH. To enable the network node 16 (e.g., gNB) to have more control of which prioritizations the WD 22 performs or has and/or to reduce ambiguity in the network node 16 (e.g., gNB) of which transmissions it should be prepared to receive, the network node 16 may send, such as via processing circuitry 68 and radio interface 62, a signal to the WD 22. The signal may include a bit field indication indicating which LCHs may use a grant. In one example, the signal is for UL configured grant (CG) PUSCH, and may be carried either by the RRC configuration of the UL CG or the activation DCI of the UL CG (e.g., if Type 2 UL CG). In another example, the signal is for dynamically scheduled PUSCH, and is carried by the UL grant DCI. For example, the UL grant DCI may include a bit field (e.g., 1-bit field) indicating a first or second set of LCHs that may use the grant. Some LCHs may belong to both the first and the second set of LCHs, while other LCHs may only belong to one of the sets.

In one embodiment, mapping between the bit field (e.g., 1-bit field) to the LCH groups may be based on the priority value in LogicalChannelConfig. In one embodiment, mapping between the bit field (e.g., 1-bit field) to the LCH groups is based on the preemptionPriorityLevel value in LogicalChannelConfig. In one embodiment, the preemptionPriorityLevel is not included in LogicalChannelConfig, and may be derived (e.g., by the WD 22 and/or network node 16) from the LCH's configured priority (as per LogicalChannelConfig) above, e.g., priority could be used instead of an additionally configured pre-emption priority level. In some embodiments, pre-emption priority could be defined as a function of priority, e.g. pre-emption priority=priority+offset.

In some embodiments, if a set S of LCHs are allowed on PUSCH, the WD 22 may, such as via processing circuitry 84, determine a pre-emption priority level P as, for example, one or more of:

P=min {preemptionPriorityLevel of LCH:LCH is in S}, or

P=min {preemptionPriorityLevel of LCH:LCH is in S and LCH has data to be mapped on the PUSCH}, or P=min {preemptionPriorityLevel of LCH:LCH is in S and data from LCH is mapped on the PUSCH}.

The WD 22 decision on prioritization between PUSCH and HARQ-ACK (UCI) transmission may be implemented at the Physical (PHY) Layer of the WD 22, while priorities of logical channels may be determined at the Medium Access Control (MAC) layer of the WD 22. In some embodiments, when determining the set S as disclosed herein, it could be implemented also partly in both MAC and PHY, such as via processing circuitry 84 and/or radio interface 82 in WD 22. For example, the MAC layer of the WD 22 may determine, such as via processing circuitry 84, the MAC Protocol Data Unit (PDU) to be transmitted based on e.g., data availability and Logical Channel Prioritization (LCP) restrictions of the logical channels; and provide that MAC PDU to PHY. The WD's 22 PHY may then check, such as via processing circuitry 84, the MAC PDU for included logical channels, which may be used to determine the set S. In some embodiments, in the particular case that no MAC PDU is provided to PHY due to e.g., no data available in eligible logical channels, the set S would be empty, i.e., PHY considers no MAC PDU as empty set S. These determinations may be made, for example by one or more, or a combination of radio interface 82 and/or processing circuitry 84.

In some embodiments, the set S of allowed LCHs on PUSCH may be determined, such as by WD 22 and/or network node 16, based on one or more of:

DCI signaling wherein e.g., one or more bit(s) indicate a set of LCH. This may also be implicit signaling, e.g., DCI indicates a certain index or indices value(s), and LCHs have configured certain indices, and the matching (e.g., of DCI indicated index/indices value(s) to LCH configurations) may indicate the set S.

LCP rules and/or restrictions determining whether logical channel data is allowed to be multiplexed on the PUSCH of the uplink grant depending on its characteristics, e.g.:

a LCH is allowed or not allowed to use a configured grant or configured grant of a certain configuration index;

a LCH is allowed or not allowed to use a dynamic grant or configured grant based on transmission parameters such as transmission duration, start and/or duration (in symbols), modulation and coding scheme (MCS) table to use, subcarrier spacing, etc.; and/or a LCH is allowed or not allowed to be transmitted on the cell/secondary cell/carrier indicated by the uplink grant.

In some embodiments, the PPL for PUSCH is directly indicated in UL DCI for dynamic grant and/or activation UL DCI for configured grant Type 2; while for configured grant Type 1, the PPL may be part of the configuration (e.g., RRC configured).

In some embodiments, how the PPL for PUSCH may be determined (by e.g., WD 22) is via extending interpretation of existing fields in UL DCI. For example, for DCI Formal 0_1 when the 2-bit field beta_offset indicator is present, a table, such as the table 9.3-3 in Technical Specification (TS) 38.213 could be extended with a new column, such as in the bolded part below:

TABLE 9.3-x

Mapping of beta_offset indicator values to offset indexes and PUSCH PPL

| beta_offset indicator | ($I_{offset,0}^{HARQ-ACK}$ or $I_{offset,1}^{HARQ-ACK}$ or $I_{offset,2}^{HARQ-ACK}$), ($I_{offset,0}^{CSI-1}$ or $I_{offset,0}^{CSI-2}$), ($I_{offset,1}^{CSI-1}$ or $I_{offset,1}^{CSI-2}$) | PUSCH PPL |
|---|---|---|
| '00' | $1^{st}$ offset index provided by higher layers | $1^{st}$ value |
| '01' | $2^{nd}$ offset index provided by higher layers | $2^{nd}$ value |
| '10' | $3^{rd}$ offset index provided by higher layers | $3^{rd}$ value |
| '11' | $4^{th}$ offset index provided by higher layers | $4^{th}$ value |

In yet another embodiment, the third column (PUSCH PPL) in the above table is an indicator for a PUSCH PPL offset. For example, if PUSCH PPL from, e.g., PPL determined from LCHs (e.g., P=min {preemptionPriorityLevel of LCH:LCH is in S}) would equal P and the PPL offset value indicated via beta_offset indicator is P_offset, then WD 22 may determine PUSCH PPL=P+P_offset. Similarly, the third column may indicate an assumed HARQ-ACK/CSI PPL or PPL offset.

Channel State Information (CSI) may be associated with a pre-emption priority level via a preemptionPriorityLevel field in CSI-ReportConfig IE (TS 38.331, version 15.6.0). In some embodiments, all CSI has a default or common RRC configured value. In another embodiment, CSI-Part1 has one pre-emption priority level value, while CSI-Part2 has another pre-emption priority level value which gives CSI-part2 lower pre-emption priority than CSI-part1.

In some embodiments of the present disclosure, the WD 22 may, such as via processing circuitry 84, perform one or more of the following steps for UCI versus PUSCH conflict resolution:

Determine a PPL for each of the UCI types that may collide with PUSCH. For example, a PPL for HARQ-ACKs, a PPL for CSI-part1, a PPL for CSI-part2, and a PPL for PUSCH;

If a timeline for UCI multiplexing on PUSCH is permitted (i.e., WD 22 has time to multiplex):

If PPL for a given UCI type is equal to or smaller than PPL for PUSCH (i.e., the UCI has a same or a higher pre-emption priority than PUSCH), then the UCI is included in UCI multiplexed with PUSCH; otherwise, the UCI is dropped. For example, if PPL for HARQ-ACK, PPL for CSI-part1, PPL for CSI-part2, respectively, is equal to or smaller than PPL for PUSCH (i.e., the UCI has a same or a higher pre-emption priority), then the UCI (e.g., HARQ-ACK, and/or CSI-part1, and/or CSI-part2) is included in UCI multiplexed with PUSCH; otherwise, the UCI is dropped;

If a timeline for UCI multiplexing on PUSCH is not permitted (e.g., WD 22 does not have time to multiplex):

If PPL for a given UCI type is smaller than PPL for PUSCH (i.e., the UCI has a higher pre-emption priority than PUSCH), then PUSCH is punctured or dropped and the UCI is sent over PUCCH. For example, if PPL for HARQ-ACK, PPL for CSI-part1, PPL for CSI-part2, respectively, is smaller than PPL for PUSCH (i.e., the UCI has higher pre-emption priority than PUSCH), then PUSCH is punctured or dropped and the UCI (e.g., HARQ-ACK, and/or CSI-part1, and/or CSI-part2) is sent over PUCCH.

If PPL for HARQ-ACK, PPL for CSI-part1, PPL for CSI-part2, respectively, equals the PPL for PUSCH, i. If a start symbol for PUSCH is earlier than a start symbol for PUCCH carrying the UCI, then the UCI is dropped;

ii. If a start symbol for PUSCH is after a start symbol for PUCCH carrying the UCI, then PUSCH is dropped/punctured.

If PPL for HARQ-ACK, PPL for CSI-part1, PPL for CSI-part2, respectively, is larger than the PPL for PUSCH (i.e., the UCI has lower pre-emption priority than PUSCH), then the UCI (e.g., HARQ-ACK, and/or CSI-part1, and/or CSI-part2) is dropped/punctured.

In some embodiments, the network node 16 may configure the WD 22 behavior, especially for the case of equal PPL between UCI and PUSCH. For example, when PPL are PrioPUSCHEqualPPL=True, the network node 16 may force or configure the WD 22 to send PUSCH and drop UCI (or give PUSCH higher priority when multiplexed with UCI), depending on the timeline. On the other hand, in some embodiments, if PrioPUSCHEqualPPL=False, then the WD 22 may give higher priority to UCI, i.e., the WD 22 stops PUSCH transmission and sends, such as via radio interface 82, UCI on PUCCH or multiple UCI with a more robust scheme (e.g., UCI with lower code rate) on PUSCH.

The above configurable parameter (e.g., PrioPUSCHEqualPPL) may also apply to the cases where non-equal PPL are present.

An example summary table, Table 2, of the above cases is shown below:

| PUSCH Priority Indicator | UCI Priority Indicator | Prioritization decision (if timeline allows for multiplexing) | Pre-emption decision (If timeline Does not allow for multiplexing) | If network node has Additional Preference | |
|---|---|---|---|---|---|
| | | | | PrioPUSCHEqualPPL = True | PrioPUSCHEqualPPL = False |
| 1 | 1 | Multiplex data and control using Rel-15 procedure | The earlier channel (either PUCCH or PUSCH) continues. The later channel is dropped. | PUSCH has higher priority | UCI has higher priority |
| 1 | 0 | UCI has higher priority | PUCCH pre-empt PUSCH | No change | No change |
| 0 | 1 | PUSCH has higher priority | PUSCH pre-empt PUCCH | No change | No change |
| 0 | 0 | Multiplex data and control using Rel-15 procedure | The earlier channel (either PUCCH or PUSCH) continues. The later channel is dropped. | PUSCH has higher priority | UCI has higher priority |

Decision (when not considering network node additional preference)

In some embodiments of the present disclosure, when a timeline for UCI multiplexing on PUSCH is not permitted and the PPL for HARQ-ACK/CSI equals the PPL of PUSCH, then the UCI (e.g., HARQ-ACK and/or CSI) is dropped by the WD 22.

In the above, it may be assumed that the priority of HARQ-ACK/CSI and PUSCH may be directly comparable through the numerical values in the PPL. In a more generalized embodiment, the comparison between PPL of HARQ-ACK/CSI and PPL of PUSCH is configurable. In one embodiment, there is an offset when comparing PPL for HARQ-ACK/CSI and PPL for PUSCH. For example, PPL_CSI>PPL_PUSCH+X (X can be an integer value) is considered that the PPL_CSI is higher than the PPL_PUSCH.

Figure 9:
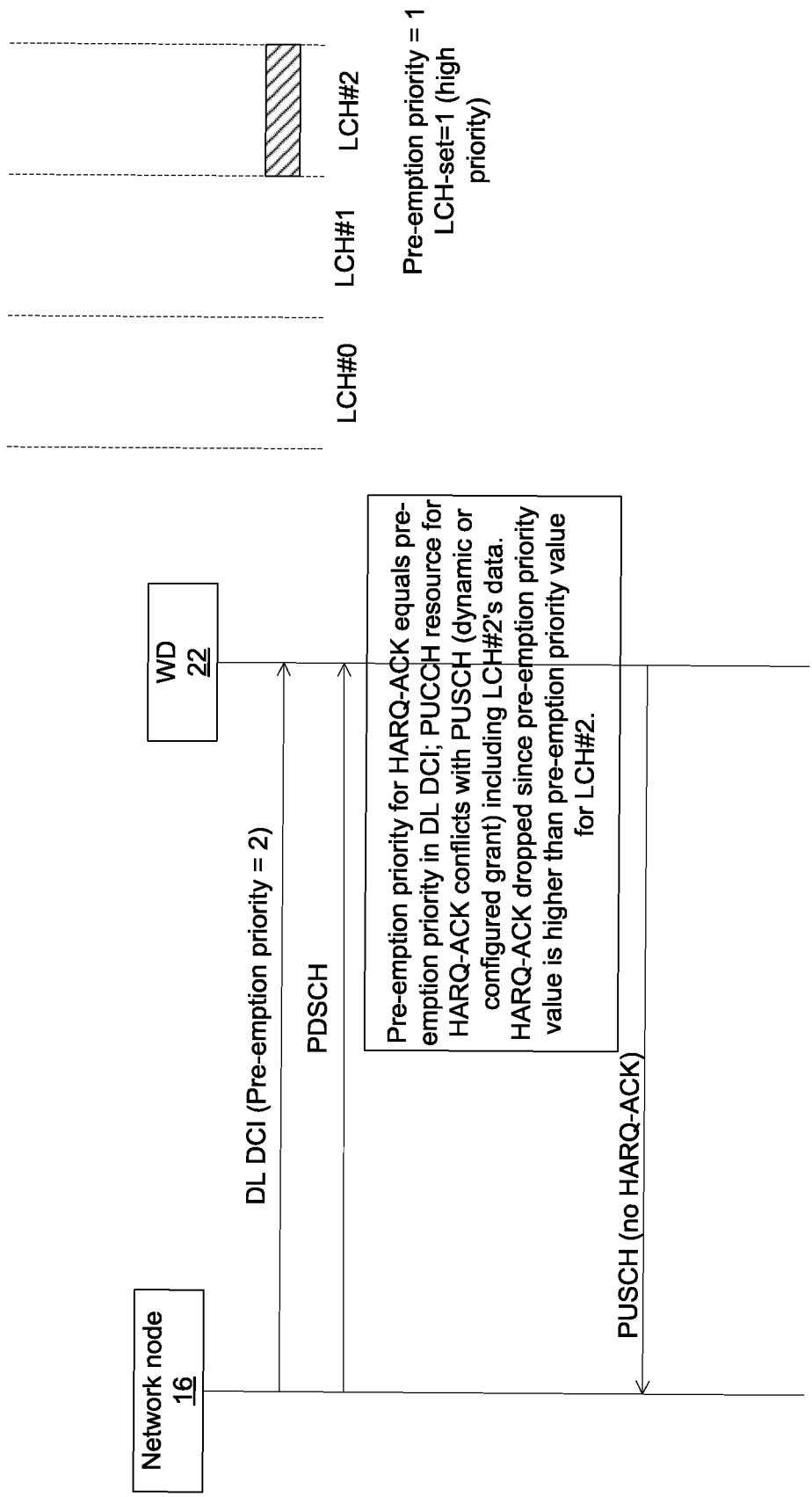
FIG. 9 illustrates an example embodiment with dynamic PDSCH and configured grant PUSCH according to some embodiments of the present disclosure.

FIG. 9 illustrates an example scenario where a HARQ-ACK associated with a scheduling DCI has a PPL that has a larger value (e.g., value of 2) than the determined PPL for a configured grant PUSCH (e.g., value of 1) and the PUCCH resource for HARQ-ACK conflicts with the PUSCH. Since PPL for the configured grant PUSCH has a lower value (e.g., 1) than PPL for the HARQ-ACK (e.g., 2) (i.e., the UL CG PUSCH has a higher pre-emption priority than HARQ-ACK), the HARQ-ACK is not multiplexed on the PUSCH by the WD 22. Recall that, similar to priority, an increasing preemptionPriorityLevel value indicates a lower pre-emption priority level in the examples described herein; however, it should be understood that some alternative embodiments may provide for a decreasing preemptionPriorityLevel value to indicate a lower pre-emption priority level.

Figure 10:
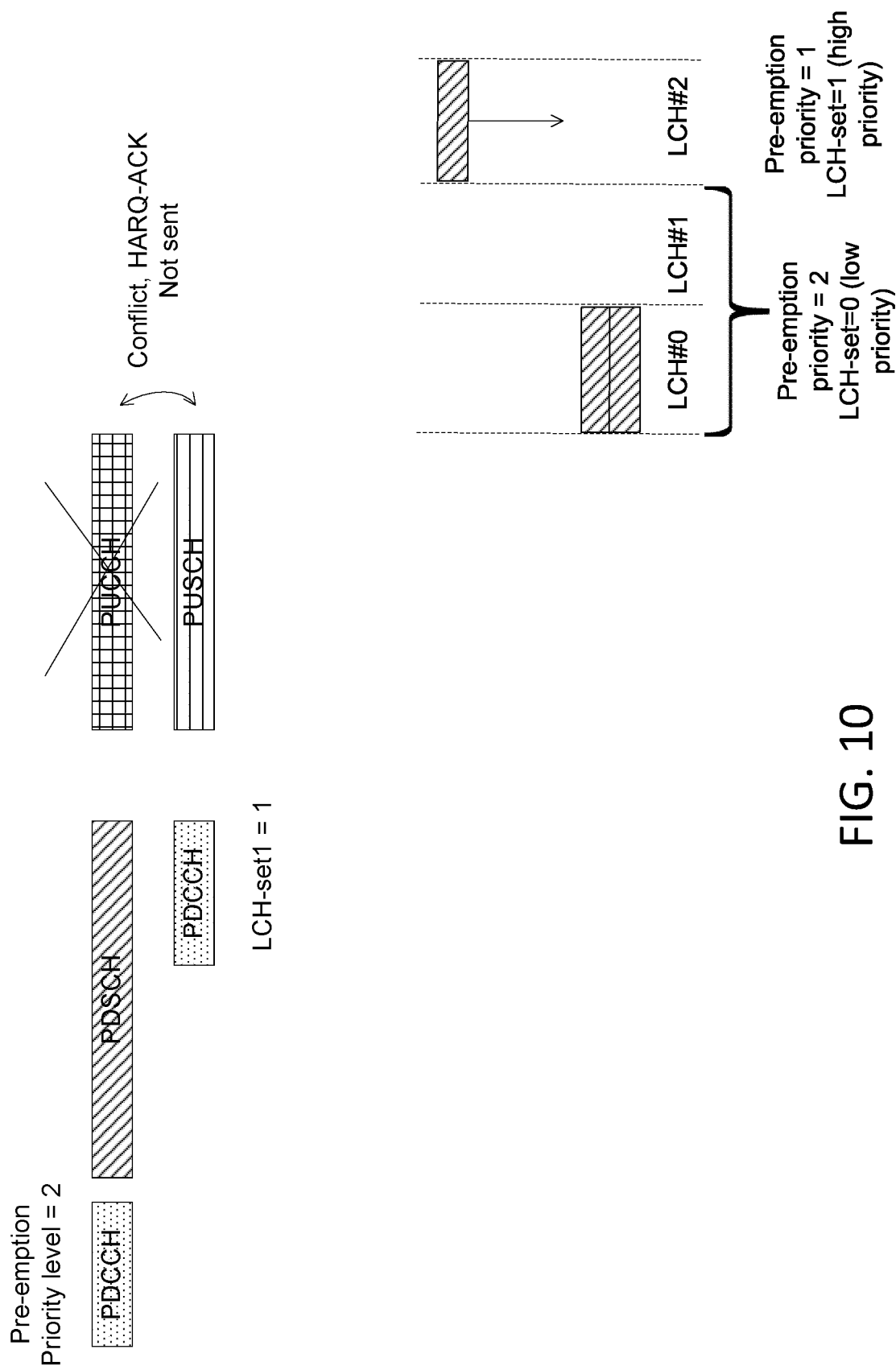
FIG. 10 illustrates an example embodiment with dynamic PDSCH and dynamic PUSCH according to some embodiments of the present disclosure.

FIG. 10 illustrates an embodiment where PUSCH is scheduled after a long PDSCH with indicated PPL=0, which is higher than the PPL for the LCHs in LCH-set1 (i.e., LCH #2). In the example scenario, the PUCCH resource for low pre-emption priority (i.e., high PPL value) HARQ-ACK conflicts with the high pre-emption priority (i.e., low PPL value) PUSCH and hence the HARQ-ACK is dropped (e.g., by WD 22).

In some embodiments of the present disclosure, there may be beta-factors for HARQ-ACK and CSI per PPL. In such embodiments, HARQ-ACK/CSI may be included (e.g., by the WD 22) in UCI multiplexed with PUSCH, even if PPL for HARQ-ACK/CSI is higher than PPL for PUSCH. For example, if there are two possible values for PPL, i.e. "low priority" and "high priority", then there may be a high-priority (or, low-priority) beta-factors field in PUSCH-Config IE (TS 38.331, version 15.6.0) according to the bolded part below:

```
-- ASN1START
-- TAG-PUSCH-CONFIG-START
PUSCH-Config ::=            SEQUENCE {
    dataScramblingIdentityPUSCH        INTEGER (0..1023)
OPTIONAL, -- Need S
    txConfig            ENUMERATED {codebook, nonCodebook}
OPTIONAL, -- Need S
    dmrs-UplinkForPUSCH-MappingTypeA       SetupRelease
{ DMRS-UplinkConfig}                OPTIONAL, -- Need M
    dmrs-UplinkForPUSCH-MappingTypeB       SetupRelease
{ DMRS-UplinkConfig}                OPTIONAL, -- Need M
    pusch-PowerControl                          OPTIONAL, --
Need M
    frequencyHopping            ENUMERATED {intraSlot, interSlot}
OPTIONAL, -- Need S
    frequencyHoppingOffsetLists        SEQUENCE (SIZE (1..4)) OF
INTEGER (1..maxNrofPhysicalResourceBlocks-1)
                                OPTIONAL, -
- Need M
    resourceAllocation          ENUMERATED { resourceAllocationType0,
resourceAllocationType1, dynamicSwitch},
```

-continued

```
pusch-TimeDomainAllocationList      SetupRelease { PUSCH-
TimeDomainResourceAllocationList }     OPTIONAL, -- Need M
    pusch-AggregationFactor         ENUMERATED { n2, n4, n8 }
OPTIONAL, -- Need S
    mcs-Table                       ENUMERATED {qam256, qam64LowSE}
OPTIONAL, -- Need S
    mcs-TableTransformPrecoder      ENUMERATED {qam256,
                                    qam64LowSE}
OPTIONAL, -- Need S
    transformPrecoder               ENUMERATED {enabled, disabled}
OPTIONAL, -- Need S
    codebookSubset                  ENUMERATED
{fullyAndPartialAndNonCoherent, partialAndNonCoherent,nonCoherent}
                                                OPTIONAL, -- Cond
codebookBased
    maxRank                 INTEGER (1..4)
OPTIONAL, -- Cond codebookBased
    rbg-Size                ENUMERATED { config2}
OPTIONAL, -- Need S
    uci-OnPUSCH                     SetupRelease { UCI-OnPUSCH}
OPTIONAL, -- Need M
    high-priority-uci-OnPUSCH       SetupRelease { UCI-OnPUSCH}
OPTIONAL, -- Need M
    tp-pi2BPSK                      ENUMERATED {enabled}
OPTIONAL, -- Need S
    ...
}
```

If a determined PPL for HARQ-ACK/CSI is "high pre-emption priority" then beta-factors for HARQ-ACK/CSI may be determined by high-priority-uci-OnPUSCH; while if the PPL is "low pre-emption priority" then beta-factors are determined by legacy uci-OnPUSCH. The reverse may also hold, where legacy beta-factor field are for "high pre-emption priority" PPL, while the new field (e.g., high-priority-uci-OnPUSCH) may be used for "low pre-emption priority" PPL.

In some embodiments where there are different beta-factors for different PPL, a second step may be performed by the WD 22, such as via processing circuitry 84 and/or radio interface 82, and may be changed to the following:

If a timeline for UCI multiplexing on PUSCH is permitted (i.e., WD 22 has time to multiplex):
Determine beta-factors for HARQ-ACK/CSI based on determined PPL;
Encode UCI according to determined beta-factors based on PPL; and/or
Transmit UCI multiplexed with PUSCH.

In some embodiments of the present disclosure, there are multiple HARQ-ACKs with different PPL. In such embodiments, the WD 22 may be configured (e.g., by network node 16 processing circuitry 68 and/or radio interface 62) with a multi-HARQ-ACK-PUCCH-ResourceList. In such embodiments, for PUCCH resources for the multiple HARQ-ACKs that overlap, the WD 22, such as via processing circuitry and/or radio interface 82, may multiplex those HARQ-ACKs on a resource determined from the multi-HARQ-ACK-PUCCH-ResourceList. In such embodiments, the PPL of the determined PUCCH resource may be determined as the lowest PPL among the multiplexed HARQ-ACKs.

In some embodiments, if the WD 22 is not configured with a multi-HARQ-ACK-PUCCH-ResourceList, the WD 22 may resolve conflicts between two or more PUCCHs. In some embodiments, the WD 22 may determine for PUCCH resources that overlap a PUCCH resource corresponding to HARQ-ACK with a lowest PPL and the other conflicting HARQ-ACKs may be dropped.

In some embodiments, when the WD 22 is configured with simultaneousHARQ-ACK-CSI the WD 22 may multiplex HARQ-ACK information with CSI reports in the same PUCCH. In some embodiments, the CSI reports are dropped (e.g., by the WD 22) if HARQ-ACK information is determined for at least one HARQ-ACK with lower PPL than the CSI. In some embodiments, if the WD 22 is not configured with simultaneousHARQ-ACK-CSI, the WD 22 drops the CSI report(s).

In some embodiments in which the WD 22 multiplexes HARQ-ACKs with different priorities, the procedure in Section 9.2.5.2 in TS 38.213, version 15.6.0 may be changed according to, for example, the bolded part:

Denote as, $O_{ACK} = \Sigma_{PPL=1}^{N_{ACK}^{total}} O_{ACK,PPL}$, where $O_{ACK,PPL}$ is the number of bits HARQ-ACK information bits of priority value n and $N_{ACK}^{total}$ is the number of pre-emption priority levels $O_{SR}$ a total number of SR bits. $O_{SR}=0$ if there is no scheduling request bit; otherwise, $O_{SR}=\lceil \log_2(K+1) \rceil$ as described in Subclause 9.2.5.1

$$O_{CSI} = \sum_{n=1}^{N_{CSI}^{total}} (O_{CSI-part1,n} + O_{CSI-part2,n}), \text{ where } O_{CSI-part1,n}$$

is a number of Part 1 CSI report bits for CSI report with priority value n, $O_{CSI\text{-}part2,n}$ is a number of Part 2 CSI report bits, if any, for CSI report with priority value n [6, TS 38.214], and $N_{CSI}^{total}$ is a number of CSI reports that include overlapping CSI reports $O_{CRC} = O_{CRC, CSI\text{-}part1} + O_{CRC, CSI\text{-}part2}$, where $O_{CRC, CSI\text{-}part1}$ is a number of CRC bits, if any, for encoding HARQ-ACK, SR and Part 1 CSI report bits and $O_{CRC, CSI\text{-}part2}$ is a number of CRC bits, if any, for encoding Part 2 CSI report bits.

In some embodiments of the present disclosure, a scheduling request (SR) has a PPL where $O_{SR}$ above may be replaced by $O_{SR} = \Sigma_{PPL=1}^{N_{SR}^{total}} O_{SR,PPL}$ similar as for HARQ-ACK. In some such embodiments, SRs may be prioritized with respect to PPL as for HARQ-ACK, CSI and PUSCH. In some such embodiments, SR may be included in UCI on PUSCH with a PPL-dependent beta-offset.

Some embodiments of the present disclosure are described herein, where a lower value for PPL means higher priority, but it should be understood that the reverse may hold, as well, in other embodiments. Further, PPL is described for values {1, . . . , n}, where n may equal 2. However, any set of integers can be used {0, . . . , n−1} or {x_1, . . . , x_n} where x_i is an integer.

In addition some embodiments may include one or more of the following:

Embodiment A1. A network node configured to communicate with a wireless device (WD), the network node configured to, and/or comprising a radio interface and/or comprising processing circuitry configured to:
indicate to the WD a priority associated with at least one uplink (UL) channel; and
receive at least one UL signal based at least in part on the indicated priority.

Embodiment A2. The network node of Embodiment A1, wherein the priority is a pre-emption priority level.

Embodiment A3. The network node of Embodiment A1, wherein one or more of:
the network node and/or the radio interface and/or the processing circuitry is further configured to cause the network node to indicate the priority in at least one of a downlink control information (DCI) message, radio resource control (RRC) signaling, and a logical channel configuration;

the at least two uplink channels include at least one of a physical uplink shared channel (PUSCH), a physical uplink control channel (PUCCH), uplink control information (UCI), channel state information (CSI) and Hybrid Automatic Repeat reQuest (HARD);

the network node and/or the radio interface and/or the processing circuitry is further configured to cause the network node to indicate the priority by being configured to cause the network node to transmit a field indicating a pre-emption priority level;

the network node and/or the radio interface and/or the processing circuitry is further configured to cause the network node to transmit a field indicating at least one set of logical channels that are allowed to use an uplink grant.

Embodiment B1. A method implemented in a network node, the method comprising:

indicating to the WD a priority associated with at least one uplink (UL) channel; and receiving at least one UL signal based at least in part on the indicated priority.

Embodiment B2. The method of Embodiment B1, wherein the priority is a pre-emption priority level.

Embodiment B3. The method of Embodiment B1, one or more of:

indicating the priority in at least one of a downlink control information (DCI) message, radio resource control (RRC) signaling, and a logical channel configuration;

the at least two uplink channels include at least one of a physical uplink shared channel (PUSCH), a physical uplink control channel (PUCCH), uplink control information (UCI), channel state information (CSI) and Hybrid Automatic Repeat reQuest (HARQ);

the indicating the priority further comprises transmitting a field indicating a pre-emption priority level;

further comprising transmitting a field indicating at least one set of logical channels that are allowed to use an uplink grant.

Embodiment C1. A wireless device (WD) configured to communicate with a network node, the WD configured to, and/or comprising a radio interface and/or processing circuitry configured to:

determine a priority associated with at least one of the at least two uplink (UL) channels; and resolve a conflict between the at least two uplink channels based at least in part on the determined priority.

Embodiment C2. The WD of Embodiment C1, wherein the priority is a pre-emption priority level.

Embodiment C3. The WD of any one of Embodiments C1 and C2, wherein one or more of:

the WD and/or the radio interface and/or the processing circuitry is further configured to cause the WD to transmit at least one UL signal according to the resolution of the conflict;

the WD and/or the radio interface and/or the processing circuitry is further configured to cause the WD to one of transmit, drop and puncture each of the at least two uplink channels based at least in part on the determined priority;

the WD and/or the radio interface and/or the processing circuitry is further configured to cause the WD to determine the priority based at least in part on an indication in at least one of a downlink control information (DCI) message, radio resource control (RRC) signaling, and a logical channel configuration;

the at least two uplink channels include at least one of a physical uplink shared channel (PUSCH), a physical uplink control channel (PUCCH), uplink control information (UCI), channel state information (CSI) and Hybrid Automatic Repeat reQuest (HARQ);

the WD and/or the radio interface and/or the processing circuitry is further configured to cause the WD to determine the priority based at least in part on a field indicating at least one set of logical channels that are allowed to use an uplink grant; and the WD and/or the radio interface and/or the processing circuitry is further configured to cause the WD to determine the priority based at least in part on a field indicating a pre-emption priority level.

Embodiment D1. A method implemented in a wireless device (WD), the method comprising:

determining a priority associated with at least one of at least two uplink (UL) channels; and resolving a conflict between the at least two uplink channels based at least in part on the determined priority.

Embodiment D2. The method of Embodiment D1, wherein the priority is a pre-emption priority level.

Embodiment D3. The method of any one of Embodiments D1 and D2, one or more of:

further comprising transmitting at least one UL signal according to the resolution of the conflict;

further comprising one of transmitting, dropping and puncturing each of the at least two uplink channels based at least in part on the determined priority;

the determining the priority further comprises determining the priority based at least in part on an indication in at least one of a downlink control information (DCI) message, radio resource control (RRC) signaling, and a logical channel configuration;

the at least two uplink channels include at least one of a physical uplink shared channel (PUSCH), a physical uplink control channel (PUCCH), uplink control information (UCI), channel state information (CSI) and Hybrid Automatic Repeat reQuest (HARQ);

the determining the priority further comprises determining the priority based at least in part on a field indicating at least one set of logical channels that are allowed to use an uplink grant; and the determining the priority further comprises determining the priority based at least in part on a field indicating a pre-emption priority level.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a network node configured to communicate with a wireless device, the method comprising:
    indicating to the wireless device a pre-emption priority level associated with at least two uplink channels;
    determining whether a timeline permits multiplexing the at least two uplink channels on a physical uplink shared channel (PUSCH); and
    when the timeline permits multiplexing the at least two uplink channels on the PUSCH, then receiving uplink control information (UCI) multiplexed with the PUSCH on overlapping resources according to pre-emption priority levels of a physical uplink control channel (PUCCH); and
    when the timeline does not permit multiplexing of the at least two uplink channels, then puncturing the PUSCH and receiving UCI over the PUCCH.

2. The method of claim 1, wherein the pre-emption priority level is configured to allow the wireless device to resolve a conflict between an uplink channel of the at least two uplink channels associated with the pre-emption priority level and at least one other uplink channel for a same uplink resource.

3. The method of claim 1, wherein the at least two uplink channels associated with the indicated pre-emption priority level is one of a PUCCH and a PUSCH.

4. The method of claim 3, wherein the pre-emption priority level is associated with at least one UCI.

5. The method of claim 4, wherein the at least one UCI includes at least one of a Hybrid Automatic Repeat reQuest (HARQ) acknowledgement (ACK) a channel state information (CSI) and a scheduling request (SR).

6. The method of claim 1, wherein the pre-emption priority level is associated with at least one logical channel (LCH).

7. The method of claim 1, wherein the indicating the pre-emption priority level comprises indicating the pre-emption priority level in at least a downlink control information (DCI) message.

8. The method of claim 7, wherein the indicating the pre-emption priority level further comprises:
    transmitting a field indicating the pre-emption priority level for a Hybrid Automatic Repeat reQuest (HARQ) acknowledgement (ACK) the field included in the DCI message, the DCI message one of scheduling and activating a physical downlink shared channel (PDSCH) to which the HARQ ACK is associated.

9. The method of claim 1, wherein the indicating the pre-emption priority level comprises indicating the pre-emption priority level in at least a field within a logical channel configuration information element (IE).

10. The method of claim 9, wherein the field within the logical channel configuration IE is a priority field, the pre-emption priority level being derived from a value in the priority field.

11. The method of claim 9, wherein the field within the logical channel configuration IE is a pre-emption priority level field, the pre-emption priority level field being different from a priority field in the logical channel configuration IE.

12. The method of claim 1, wherein the indicating the pre-emption priority level comprises indicating the pre-emption priority level in at least one of:
   a beta offset indicator;
   a radio resource control (RRC) signaling;
   a field within a channel state information report configuration information element (IE);
   a beta factors field in a PUSCH configuration IE; and
   a multiple Hybrid Automatic Repeat reQuest (HARQ) acknowledgments (ACKs) PUCCH resource list parameter indicating a pre-emption priority level for each of the multiple HARQ ACKs.

13. A method implemented in a wireless device configured to communicate with a network node, the method comprising:
   determining a pre-emption priority level associated with a physical uplink control channel (PUCCH) of at least two uplink channels on overlapping resources;
   determining whether a timeline permits multiplexing the at least two uplink channels on a physical uplink shared channel (PUSCH);
   when the timeline permits multiplexing the at least two uplink channels on the PUSCH, then transmitting uplink control information (UCI) multiplexed with the PUSCH on the overlapping resources according to pre-emption priority levels of the PUCCH; and
   when the timeline does not permit multiplexing of the at least two uplink channels, then puncturing the PUSCH and transmitting UCI over the PUCCH.

14. The method of claim 13, wherein determining the pre-emption priority level comprises obtaining a downlink control information (DCI) message comprising the pre-emption priority level from the network node, the DCI scheduling a downlink transmission and a HARQ ACK is feedback of whether the downlink transmission is successfully received.

15. The method of claim 13, further comprising: determining a pre-emption priority level associated with another uplink channel of the at least two uplink channels, the another uplink channel being PUCCH or PUSCH; and
   prior to transmitting a HARQ ACK:
      determining that the PUCCH has same or higher pre-emption priority level than that of the another uplink channel.

16. The method of claim 15, further comprising: dropping the HARQ ACK when determining that the PUCCH has lower pre-emption priority level than that of the another uplink channel.

17. The method of claim 13, wherein the at least two uplink channels associated with the determined pre-emption priority level is one of a PUCCH and a PUSCH.

18. The method of claim 17, wherein the pre-emption priority level is associated with at least one UCI.

19. The method of claim 18, wherein the at least one UCI includes at least one of a HARQACK, a channel state information (CSI) and a scheduling request (SR).

20. The method of claim 13, wherein the pre-emption priority level is associated with at least one logical channel (LCH).

21. The method of claim 13, wherein the determining the pre-emption priority level comprises:
   determining the pre-emption priority level based at least in part on an indication of the pre-emption priority level in at least a downlink control information (DCI) message.

* * * * *